US009612132B2

(12) United States Patent
Borleske et al.

(10) Patent No.: US 9,612,132 B2
(45) Date of Patent: Apr. 4, 2017

(54) OPTIMIZED DATA COLLECTION IN A WIRELESS FIXED NETWORK METERING SYSTEM

(75) Inventors: Andrew J. Borleske, Garner, NC (US); Kenneth C. Shuey, Zebulon, NC (US); Robert T. Mason, Jr., Raleigh, NC (US); David V. Uy, Raleigh, NC (US)

(73) Assignee: Elster Solutions, LLC, Raleigh, NC (US)

( * ) Notice: Subject to any disclaimer, the term of this patent is extended or adjusted under 35 U.S.C. 154(b) by 1215 days.

(21) Appl. No.: 12/344,015

(22) Filed: Dec. 24, 2008

(65) Prior Publication Data

US 2009/0167558 A1    Jul. 2, 2009

Related U.S. Application Data

(60) Provisional application No. 61/016,767, filed on Dec. 26, 2007.

(51) Int. Cl.
*G01D 4/00* (2006.01)
(52) U.S. Cl.
CPC ............ *G01D 4/002* (2013.01); *Y02B 90/241* (2013.01); *Y02B 90/246* (2013.01); *Y04S 20/32* (2013.01); *Y04S 20/42* (2013.01)
(58) Field of Classification Search
USPC ....................................... 340/870.02–870.03
See application file for complete search history.

(56) References Cited

U.S. PATENT DOCUMENTS 3,445,815 A    5/1969   Saltzberg et al.
3,858,212 A   12/1974   Tompkins et al.
(Continued)

FOREIGN PATENT DOCUMENTS

CH          682196 A5     7/1993
EP        0395495 A1    10/1990
(Continued)

OTHER PUBLICATIONS

US Patent Application No. PCT/US08/88328: International Preliminary Report on Patentability, dated Mar. 30, 2011, 7 pages.
(Continued)

*Primary Examiner* — Albert Wong
(74) *Attorney, Agent, or Firm* — Baker & Hostetler LLP

(57) ABSTRACT

Methods and systems regarding an electricity meter in a wireless network are disclosed. The network may comprise a collector and a plurality of electricity meters that measure consumption of electricity and that bi-directionally communicate wirelessly with the collector. The electricity meter may have an established association with at least one battery-powered meter that measures consumption of a commodity other than electricity. The electricity meter may receive information about measured consumption of the other commodity from the battery-powered meter and store the received information. The electricity meter may transmit both information about consumption of electricity measured by the electricity meter and the information about consumption of the other commodity received from the associated battery-powered meter to the collector via the wireless network and also to a remotely located display associated with the electricity meter.

16 Claims, 10 Drawing Sheets

(56) References Cited

U.S. PATENT DOCUMENTS

| | | |
|---|---|---|
| 3,878,512 A | 4/1975 | Kobayashi et al. |
| 3,973,240 A | 8/1976 | Fong |
| 4,031,513 A | 6/1977 | Simciak |
| 4,056,107 A | 11/1977 | Todd et al. |
| 4,066,964 A | 1/1978 | Costanza et al. |
| 4,132,981 A | 1/1979 | White |
| 4,190,800 A | 2/1980 | Kelly, Jr. et al. |
| 4,204,195 A | 5/1980 | Bogacki |
| 4,218,737 A | 8/1980 | Buscher et al. |
| 4,250,489 A | 2/1981 | Dudash et al. |
| 4,254,472 A | 3/1981 | Juengel et al. |
| 4,319,358 A | 3/1982 | Sepp |
| 4,321,582 A | 3/1982 | Banghart |
| 4,322,842 A | 3/1982 | Martinez |
| 4,328,581 A | 5/1982 | Harmon et al. |
| 4,361,851 A | 11/1982 | Asip et al. |
| 4,361,890 A | 11/1982 | Green, Jr. et al. |
| 4,396,915 A | 8/1983 | Farnsworth et al. |
| 4,405,829 A | 9/1983 | Rivest et al. |
| 4,415,896 A | 11/1983 | Allgood |
| 4,466,001 A | 8/1984 | Moore et al. |
| 4,504,831 A | 3/1985 | Jahr et al. |
| 4,506,386 A | 3/1985 | Ichikawa et al. |
| 4,513,415 A | 4/1985 | Martinez |
| 4,525,861 A | 6/1985 | Freeburg |
| 4,600,923 A | 7/1986 | Hicks et al. |
| 4,608,699 A | 8/1986 | Batlivala et al. |
| 4,611,333 A | 9/1986 | McCallister et al. |
| 4,614,945 A | 9/1986 | Brunius et al. |
| 4,617,566 A | 10/1986 | Diamond |
| 4,628,313 A | 12/1986 | Gombrich et al. |
| 4,631,538 A | 12/1986 | Carreno |
| 4,638,298 A | 1/1987 | Spiro |
| 4,644,321 A | 2/1987 | Kennon |
| 4,653,076 A | 3/1987 | Jerrim et al. |
| 4,672,555 A | 6/1987 | Hart et al. |
| 4,680,704 A | 7/1987 | Konicek et al. |
| 4,688,038 A | 8/1987 | Giammarese |
| 4,692,761 A | 9/1987 | Robinton |
| 4,707,852 A | 11/1987 | Jahr et al. |
| 4,713,837 A | 12/1987 | Gordon |
| 4,724,435 A | 2/1988 | Moses et al. |
| 4,728,950 A | 3/1988 | Hendrickson et al. |
| 4,734,680 A | 3/1988 | Gehman et al. |
| 4,749,992 A | 6/1988 | Fitzemeyer et al. |
| 4,757,456 A | 7/1988 | Benghiat |
| 4,769,772 A | 9/1988 | Dwyer |
| 4,783,748 A | 11/1988 | Swartztrauber et al. |
| 4,792,946 A | 12/1988 | Mayo |
| 4,799,059 A | 1/1989 | Grindahl et al. |
| 4,804,938 A | 2/1989 | Rouse et al. |
| 4,804,957 A | 2/1989 | Selph et al. |
| 4,811,011 A | 3/1989 | Sollinger |
| 4,827,514 A | 5/1989 | Ziolko et al. |
| 4,833,618 A | 5/1989 | Verma et al. |
| 4,839,645 A | 6/1989 | Lill |
| 4,841,545 A | 6/1989 | Endo et al. |
| 4,860,379 A | 8/1989 | Schoeneberger et al. |
| 4,862,493 A | 8/1989 | Venkataraman et al. |
| 4,868,877 A | 9/1989 | Fischer |
| 4,884,021 A | 11/1989 | Hammond et al. |
| 4,912,722 A | 3/1990 | Carlin |
| 4,922,518 A | 5/1990 | Gordon et al. |
| 4,939,726 A | 7/1990 | Flammer et al. |
| 4,940,974 A | 7/1990 | Sojka |
| 4,940,976 A | 7/1990 | Gastouniotis et al. |
| 4,958,359 A | 9/1990 | Kato |
| 4,964,138 A | 10/1990 | Nease et al. |
| 4,965,533 A | 10/1990 | Gilmore |
| 4,972,507 A | 11/1990 | Lusignan |
| 5,007,052 A | 4/1991 | Flammer |
| 5,018,165 A | 5/1991 | Sohner et al. |
| 5,022,046 A | 6/1991 | Morrow, Jr. |
| 5,032,833 A | 7/1991 | Laporte |
| 5,053,766 A | 10/1991 | Ruiz-del-Portal et al. |
| 5,053,774 A | 10/1991 | Schuermann et al. |
| 5,056,107 A | 10/1991 | Johnson et al. |
| 5,067,136 A | 11/1991 | Arthur et al. |
| 5,079,715 A | 1/1992 | Venkataraman et al. |
| 5,079,768 A | 1/1992 | Flammer |
| 5,086,292 A | 2/1992 | Johnson et al. |
| 5,086,385 A | 2/1992 | Launey |
| 5,090,024 A | 2/1992 | Vander Mey et al. |
| 5,111,479 A | 5/1992 | Akazawa |
| 5,115,433 A | 5/1992 | Baran et al. |
| 5,115,448 A | 5/1992 | Mori |
| 5,129,096 A | 7/1992 | Burns |
| 5,130,987 A | 7/1992 | Flammer |
| 5,132,985 A | 7/1992 | Hashimoto et al. |
| 5,136,614 A | 8/1992 | Hiramatsu et al. |
| 5,142,694 A | 8/1992 | Jackson et al. |
| 5,151,866 A | 9/1992 | Glaser et al. |
| 5,155,481 A | 10/1992 | Brennan, Jr. et al. |
| 5,160,926 A | 11/1992 | Schweitzer, III |
| 5,166,664 A | 11/1992 | Fish |
| 5,177,767 A | 1/1993 | Kato |
| 5,179,376 A | 1/1993 | Pomatto |
| 5,189,694 A | 2/1993 | Garland |
| 5,194,860 A | 3/1993 | Jones et al. |
| 5,197,095 A | 3/1993 | Bonnet |
| 5,204,877 A | 4/1993 | Endo et al. |
| 5,214,587 A | 5/1993 | Green |
| 5,225,994 A | 7/1993 | Arinobu et al. |
| 5,228,029 A | 7/1993 | Kotzin |
| 5,229,996 A | 7/1993 | Bäckström et al. |
| 5,239,575 A | 8/1993 | White et al. |
| 5,239,584 A | 8/1993 | Hershey et al. |
| 5,243,338 A | 9/1993 | Brennan, Jr. et al. |
| 5,252,967 A | 10/1993 | Brennan et al. |
| 5,260,943 A | 11/1993 | Comroe et al. |
| 5,270,704 A | 12/1993 | Sosa Quintana et al. |
| 5,280,499 A | 1/1994 | Suzuki |
| 5,285,469 A | 2/1994 | Vanderpool |
| 5,287,287 A | 2/1994 | Chamberlain et al. |
| 5,289,497 A | 2/1994 | Jacobson et al. |
| 5,295,154 A | 3/1994 | Meier et al. |
| 5,307,349 A | 4/1994 | Shloss et al. |
| 5,311,541 A | 5/1994 | Sanderford, Jr. |
| 5,311,542 A | 5/1994 | Eder |
| 5,315,531 A | 5/1994 | Oravetz et al. |
| 5,319,679 A | 6/1994 | Bagby |
| 5,329,547 A | 7/1994 | Ling |
| 5,345,225 A | 9/1994 | Davis |
| 5,359,625 A | 10/1994 | Vander Mey et al. |
| 5,377,222 A | 12/1994 | Sanderford, Jr. |
| 5,381,462 A | 1/1995 | Larson et al. |
| 5,383,134 A | 1/1995 | Wrzesinski |
| 5,384,712 A | 1/1995 | Oravetz et al. |
| 5,387,873 A | 2/1995 | Muller et al. |
| 5,390,360 A | 2/1995 | Scop et al. |
| 5,406,495 A | 4/1995 | Hill |
| 5,416,917 A | 5/1995 | Adair et al. |
| 5,420,799 A | 5/1995 | Peterson et al. |
| 5,428,636 A | 6/1995 | Meier |
| 5,430,759 A | 7/1995 | Yokev et al. |
| 5,432,507 A | 7/1995 | Mussino et al. |
| 5,432,815 A | 7/1995 | Kang et al. |
| 5,438,329 A | 8/1995 | Gastouniotis et al. |
| 5,448,230 A | 9/1995 | Schanker et al. |
| 5,448,570 A | 9/1995 | Toda et al. |
| 5,450,088 A | 9/1995 | Meier et al. |
| 5,452,465 A | 9/1995 | Geller et al. |
| 5,455,533 A | 10/1995 | Köllner |
| 5,455,544 A | 10/1995 | Kechkaylo |
| 5,455,569 A | 10/1995 | Sherman et al. |
| 5,455,822 A | 10/1995 | Dixon et al. |
| 5,457,713 A | 10/1995 | Sanderford, Jr. et al. |
| 5,461,558 A | 10/1995 | Patsiokas et al. |
| 5,463,657 A | 10/1995 | Rice |
| 5,473,322 A | 12/1995 | Carney |
| 5,475,742 A | 12/1995 | Gilbert |
| 5,475,867 A | 12/1995 | Blum |
| 5,479,442 A | 12/1995 | Yamamoto |
| 5,481,259 A | 1/1996 | Bane |

(56) References Cited

U.S. PATENT DOCUMENTS

| | | |
|---|---|---|
| 5,488,608 A | 1/1996 | Flammer, III |
| 5,491,473 A | 2/1996 | Gilbert |
| 5,493,287 A | 2/1996 | Bane |
| 5,495,239 A | 2/1996 | Ouellette |
| 5,497,424 A | 3/1996 | Vanderpool |
| 5,499,243 A | 3/1996 | Hall |
| 5,500,871 A | 3/1996 | Kato et al. |
| 5,511,188 A | 4/1996 | Pascucci et al. |
| 5,519,388 A | 5/1996 | Adair, Jr. |
| 5,521,910 A | 5/1996 | Matthews |
| 5,522,044 A | 5/1996 | Pascucci et al. |
| 4,749,992 B1 | 6/1996 | Fitzmeyer et al. |
| 5,524,280 A | 6/1996 | Douthitt et al. |
| 5,525,898 A | 6/1996 | Lee, Jr. et al. |
| 5,526,389 A | 6/1996 | Buell et al. |
| 5,528,507 A | 6/1996 | McNamara et al. |
| 5,528,597 A | 6/1996 | Gerszberg et al. |
| 5,539,775 A | 7/1996 | Tuttle et al. |
| 5,541,589 A | 7/1996 | Delaney |
| 5,544,036 A | 8/1996 | Brown, Jr. et al. |
| 5,546,424 A | 8/1996 | Miyake |
| 5,548,527 A | 8/1996 | Hemminger et al. |
| 5,548,633 A | 8/1996 | Kujawa et al. |
| 5,553,094 A | 9/1996 | Johnson et al. |
| 5,555,508 A | 9/1996 | Munday et al. |
| 5,559,870 A | 9/1996 | Patton et al. |
| 5,566,332 A | 10/1996 | Adair et al. |
| 5,570,084 A | 10/1996 | Ritter et al. |
| 5,572,438 A | 11/1996 | Ehlers et al. |
| 5,574,657 A | 11/1996 | Tofte |
| 5,590,179 A | 12/1996 | Shincovich et al. |
| 5,592,470 A | 1/1997 | Rudrapatna et al. |
| 5,594,740 A | 1/1997 | LaDue |
| 5,602,744 A | 2/1997 | Meek et al. |
| 5,617,084 A | 4/1997 | Sears |
| 5,619,192 A | 4/1997 | Ayala |
| 5,619,685 A | 4/1997 | Schiavone |
| 5,621,629 A | 4/1997 | Hemminer et al. |
| 5,627,759 A | 5/1997 | Bearden et al. |
| 5,631,636 A | 5/1997 | Bane |
| 5,636,216 A | 6/1997 | Fox et al. |
| 5,640,679 A | 6/1997 | Lundqvist et al. |
| 5,659,300 A | 8/1997 | Dresselhuys et al. |
| 5,668,803 A | 9/1997 | Tymes et al. |
| 5,668,828 A | 9/1997 | Sanderford, Jr. et al. |
| 5,673,252 A | 9/1997 | Johnson et al. |
| 5,684,472 A | 11/1997 | Bane |
| 5,684,799 A | 11/1997 | Bigham et al. |
| 5,691,715 A | 11/1997 | Ouellette |
| 5,692,180 A | 11/1997 | Lee |
| 5,696,501 A | 12/1997 | Ouellette et al. |
| 5,696,765 A | 12/1997 | Safadi |
| 5,696,903 A | 12/1997 | Mahany |
| 5,699,276 A | 12/1997 | Roos |
| 5,714,931 A | 2/1998 | Petite et al. |
| 5,715,390 A | 2/1998 | Hoffman et al. |
| 5,717,604 A | 2/1998 | Wiggins |
| 5,719,564 A | 2/1998 | Sears |
| 5,745,901 A | 4/1998 | Entner et al. |
| 5,748,104 A | 5/1998 | Argyroudis et al. |
| 5,748,619 A | 5/1998 | Meier |
| 5,751,914 A | 5/1998 | Coley et al. |
| 5,751,961 A | 5/1998 | Smyk |
| 5,754,772 A | 5/1998 | Leaf |
| 5,754,830 A | 5/1998 | Butts et al. |
| 5,757,783 A | 5/1998 | Eng et al. |
| 5,768,148 A | 6/1998 | Murphy et al. |
| 5,778,368 A | 7/1998 | Hogan et al. |
| 5,787,437 A | 7/1998 | Potterveld et al. |
| 5,790,789 A | 8/1998 | Suarez |
| 5,790,809 A | 8/1998 | Holmes |
| 5,801,643 A | 9/1998 | Williams et al. |
| 5,805,712 A | 9/1998 | Davis |
| 5,808,558 A | 9/1998 | Meek et al. |
| 5,809,059 A | 9/1998 | Souissi et al. |
| 5,822,521 A | 10/1998 | Gartner et al. |
| 5,850,187 A | 12/1998 | Carrender et al. |
| 5,862,391 A | 1/1999 | Salas et al. |
| 5,872,774 A | 2/1999 | Wheatley, III et al. |
| 5,874,903 A | 2/1999 | Shuey et al. |
| 5,875,183 A | 2/1999 | Nitadori |
| 5,875,402 A | 2/1999 | Yamawaki |
| 5,884,184 A | 3/1999 | Sheffer |
| 5,892,758 A | 4/1999 | Argyroudis |
| 5,896,382 A | 4/1999 | Davis et al. |
| 5,897,607 A | 4/1999 | Jenney et al. |
| 5,898,387 A | 4/1999 | Davis et al. |
| 5,907,491 A | 5/1999 | Canada et al. |
| 5,907,540 A | 5/1999 | Hayashi |
| 5,910,799 A | 6/1999 | Carpenter et al. |
| 5,923,269 A | 7/1999 | Shuey et al. |
| 5,926,103 A | 7/1999 | Petite |
| 5,926,531 A | 7/1999 | Petite |
| 5,943,375 A | 8/1999 | Veintimilla |
| 5,944,842 A | 8/1999 | Propp et al. |
| 5,953,319 A | 9/1999 | Dutta et al. |
| 5,958,018 A | 9/1999 | Eng et al. |
| 5,959,550 A | 9/1999 | Giles |
| 5,960,074 A | 9/1999 | Clark |
| 5,963,146 A | 10/1999 | Johnson et al. |
| 5,974,236 A | 10/1999 | Sherman |
| 5,986,574 A * | 11/1999 | Colton ............... G01D 4/004 340/12.32 |
| 5,994,892 A | 11/1999 | Turino et al. |
| 6,000,034 A | 12/1999 | Lightbody et al. |
| 6,028,522 A | 2/2000 | Petite |
| 6,034,988 A | 3/2000 | VanderMey et al. |
| 6,035,201 A | 3/2000 | Whitehead |
| 6,041,056 A | 3/2000 | Bigham et al. |
| 6,061,604 A | 5/2000 | Russ et al. |
| 6,067,029 A | 5/2000 | Durston |
| 6,073,169 A | 6/2000 | Shuey et al. |
| 6,073,174 A | 6/2000 | Montgomerie et al. |
| 6,078,251 A | 6/2000 | Landt et al. |
| 6,078,909 A | 6/2000 | Knutson |
| 6,088,659 A | 7/2000 | Kelley et al. |
| 6,091,758 A | 7/2000 | Ciccone et al. |
| 6,100,817 A | 8/2000 | Mason, Jr. et al. |
| 6,112,192 A | 8/2000 | Capek |
| 6,124,806 A | 9/2000 | Cunningham et al. |
| 6,128,276 A | 10/2000 | Agee |
| 6,137,423 A | 10/2000 | Glorioso et al. |
| 6,150,955 A | 11/2000 | Tracy et al. |
| 6,154,487 A | 11/2000 | Murai et al. |
| 6,160,993 A | 12/2000 | Wilson |
| 6,172,616 B1 | 1/2001 | Johnson et al. |
| 6,195,018 B1 | 2/2001 | Ragle et al. |
| 6,199,068 B1 | 3/2001 | Carpenter |
| 6,208,266 B1 | 3/2001 | Lyons et al. |
| 6,218,953 B1 | 4/2001 | Petite |
| 6,233,327 B1 | 5/2001 | Petite |
| 6,246,677 B1 | 6/2001 | Nap et al. |
| 6,249,516 B1 | 6/2001 | Brownrigg et al. |
| 6,333,975 B1 | 12/2001 | Brunn et al. |
| 6,363,057 B1 | 3/2002 | Ardalan et al. |
| 6,373,399 B1 | 4/2002 | Johnson et al. |
| 6,393,341 B1 | 5/2002 | Lawrence et al. |
| 6,396,839 B1 | 5/2002 | Ardalan et al. |
| 6,421,731 B1 | 7/2002 | Ciotti, Jr. et al. |
| 6,430,268 B1 | 8/2002 | Petite |
| 6,437,692 B1 | 8/2002 | Petite et al. |
| 6,446,192 B1 | 9/2002 | Narasimhan et al. |
| 6,643,278 B1 | 11/2003 | Panasik et al. |
| 6,657,549 B1 | 12/2003 | Avery |
| 6,657,552 B2 * | 12/2003 | Belski et al. ............ 340/870.02 |
| 6,684,245 B1 | 1/2004 | Shuey et al. |
| 6,751,563 B2 | 6/2004 | Spanier et al. |
| 6,856,257 B1 | 2/2005 | Van Heteren |
| 6,867,707 B1 | 3/2005 | Kelley et al. |
| 7,185,131 B2 * | 2/2007 | Leach ............................. 710/305 |
| 7,321,316 B2 | 1/2008 | Hancock et al. |
| 7,343,255 B2 | 3/2008 | Osterloh et al. |
| 7,349,370 B2 | 3/2008 | Lee et al. |
| 8,073,384 B2 | 12/2011 | Shuey |

(56) References Cited

U.S. PATENT DOCUMENTS

| | | | |
|---|---|---|---|
| 2001/0002210 A1 | 5/2001 | Petite | |
| 2001/0024163 A1 | 9/2001 | Petite | |
| 2002/0012323 A1 | 1/2002 | Petite et al. | |
| 2002/0013679 A1 | 1/2002 | Petite | |
| 2002/0019712 A1 | 2/2002 | Petite et al. | |
| 2002/0019725 A1 | 2/2002 | Petite | |
| 2002/0026957 A1 | 3/2002 | Reyman | |
| 2002/0027504 A1 | 3/2002 | Davis et al. | |
| 2002/0031101 A1 | 3/2002 | Petite et al. | |
| 2002/0094799 A1 | 7/2002 | Elliot et al. | |
| 2002/0125998 A1 | 9/2002 | Petite et al. | |
| 2002/0145537 A1 | 10/2002 | Mueller et al. | |
| 2002/0169643 A1 | 11/2002 | Petite et al. | |
| 2003/0036810 A1 | 2/2003 | Petite | |
| 2003/0036822 A1 | 2/2003 | Davis et al. | |
| 2003/0123442 A1 | 7/2003 | Drucker et al. | |
| 2003/0202512 A1 | 10/2003 | Kennedy | |
| 2004/0001008 A1 | 1/2004 | Shuey et al. | |
| 2004/0113810 A1 | 6/2004 | Mason, Jr. et al. | |
| 2005/0083210 A1 | 4/2005 | Shuey et al. | |
| 2005/0184881 A1 | 8/2005 | Dusenberry et al. | |
| 2005/0190074 A1 | 9/2005 | Cumeralto et al. | |
| 2005/0237221 A1 | 10/2005 | Brian et al. | |
| 2005/0270173 A1 | 12/2005 | Boaz | |
| 2006/0031180 A1 | 2/2006 | Tamarkin et al. | |
| 2006/0256802 A1 | 11/2006 | Edwards | |
| 2007/0001868 A1 | 1/2007 | Boaz | |
| 2007/0013547 A1* | 1/2007 | Boaz | G01D 4/002 340/870.02 |
| 2007/0013548 A1* | 1/2007 | Sendrowicz | 340/870.02 |
| 2007/0058632 A1 | 3/2007 | Back et al. | |
| 2007/0120705 A1 | 5/2007 | Kiiskila et al. | |
| 2007/0200729 A1* | 8/2007 | Borleske | G01D 4/004 340/870.02 |
| 2007/0220606 A1 | 9/2007 | Omote et al. | |
| 2008/0051036 A1 | 2/2008 | Vaswani et al. | |
| 2008/0150750 A1* | 6/2008 | Parris et al. | 340/870.02 |
| 2008/0220803 A1 | 9/2008 | Lee et al. | |
| 2009/0115626 A1 | 5/2009 | Vaswani et al. | |
| 2009/0179771 A1 | 7/2009 | Seal et al. | |
| 2009/0225811 A1 | 9/2009 | Albert et al. | |
| 2009/0267792 A1 | 10/2009 | Crichlow | |
| 2010/0165795 A1 | 7/2010 | Elder et al. | |
| 2010/0188255 A1 | 7/2010 | Cornwall | |
| 2010/0188263 A1 | 7/2010 | Cornwall et al. | |
| 2011/0050456 A1 | 3/2011 | Cornwall et al. | |
| 2011/0074599 A1 | 3/2011 | Cornwall et al. | |

FOREIGN PATENT DOCUMENTS

| | | |
|---|---|---|
| EP | 0446979 A1 | 9/1991 |
| EP | 0629098 A2 | 12/1994 |
| EP | 2187174 | 5/2010 |
| GB | 2118340 A | 10/1983 |
| GB | 2157448 A | 10/1985 |
| GB | 2186404 A | 8/1987 |
| GB | 02222898 A | 3/1990 |
| GB | 2237910 A | 5/1991 |
| JP | 59229949 | 12/1984 |
| JP | 0267967 | 3/1990 |
| JP | 4290593 A | 10/1992 |
| JP | 5260569 | 10/1993 |
| JP | 8194023 A | 7/1996 |
| WO | WO 9302515 A1 | 2/1993 |
| WO | WO 9304451 A1 | 3/1993 |
| WO | WO 9532595 A1 | 11/1995 |
| WO | WO 9610856 A1 | 4/1996 |
| WO | WO 2004/004364 A2 | 1/2004 |

OTHER PUBLICATIONS

"MV-90 Read Only System" UTS Software Solutions for Utility Customers. (No Date). (No Page Numbers or Pages).

"Packet Radio: Applications for Libraries in Developing Countries", UDT Series on Data Communication Technologies and Standards for Libraries, No Month Available 1993, Ch 1-6, 87 pages.

Brochure: TRF6900 Single-Chip RF Transceiver, Texas Instrument, Sep. 2001 ©.

Brownrigg,E. B., "The Internet as an External Economy: The Emergence of the Invisible Hand", Library Administration and Management, No Month Available, 1991,95-97.

Brownrigg,E. Ph.D., "Developing the Information Superhighway Issues for Libraries", Library Perspectives on NREN, The National Research and Education Network, No Month Available, 1990, 55-63.

Chlamtac, I. et al., "Optimizing the System of Virtual Paths", IEEE ACM Transactions on Networking, Dec. 6, 1994,2(6), 58 1-586.

Corcoran, P.M. et al., "Browser-Style Interfaces to a Home Automation Network", IEEE Trans. on Consumer Electronics, Nov. 1, 1997,43(4), 1063-1069, XP-000768559.

Corcoran, P.M. et al., "CEBus Network Access via the World-Wide-Web",—International Conference on Consumer Electronics, Jun. 5-7, 1996,236-237, XP-002218722.

Desbonnet, Joe et al., "System Architecture and Implementation of CEBus/Internet Gateway", IEEE, Jun. 18, 1997, 1057-1062.

Frankel, M.S., "Packet Radios Provide Link for Distributed, Survivable C3 in Post-Attack Scenarios", MSN, Jun. 1983,80-108.

Gower, N. et al., "Congestion Control Using Pacing in a Packet Radio Network", IEEE Military Communications Conference, No Month Available, 1982, 1,23.1-1,23-1-6.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http:www.ardis.com, "Ardis Two-Way, Wireless Data Communications," Ardis, Sep. 23, 1998.

Internet Printout, http://www.ardis.com/RADIO, "Radio Coverage," Sep. 29, 1998 "Glossary of Terms," Sep. 29, 1998, "Radio Propagation in Free Space," Sep. 29, 1998, "Real World Propagation Variations," Sep. 29, 1998, "Probability of Reception vs. Calculation," Sep. 29, 1998.

Internet Printout, http://www.ram.com BellSouth Wireless Data—Paging, Mobitex, Network, Business, Sep. 23, 1998:—Mobitex@: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet DataNe'tworks, a RAM Mobile Data White Paper, Oct. 1995—Comparative Analysis of Coverage and Performance: RAM & Ardis,1998.

Jubin, J., "Current Packet Radio Networks Protocols", IEEE Infocom Proceedings, No Month Available, 1985,86-92.

Kahn, R.E., "The Organization of Computer Resources into a Packet Radio Network", IEEE Transactions on Communications, Jan. 1977, 25(1), 169-178.

Kahn, R.E., et al., "Advances in Packet Radio Technology", proceedings of the IEEE, Nov. 1978, 66(1 I), 1468-1496.

Lauer, G. et al., "Survivable Protocols for Large Scale Packet Radio Networks", IEEE Global Telecommunications Conference, No Month Available 1984,468-47 1.

Leung, V.C.M., "Internetworking Wireless Terminals to Local Area Networks Via Radio Bridges", ICWC, No Month Available No Month Available 1992, 126-1 29.

Lynch, C.A. et al., "Electronic Publishing, Electronic Imaging, and Document Delivery", Electronic Imaging, International Electronic Imaging Exposition & Conference, No Month Available 1986,662-667.

Lynch, C.A. et al., "Routing, Repeating, Power Control and Directional Techniques", Packet Radio Networks, Architectures, Protocols, Technologies and Applications, No Month Available 1987, Ch 5, 105-129, 259-274.

(56) References Cited

OTHER PUBLICATIONS

Lynch, C.A. et al., "The Telecommunications Landscape", No Month Available 1986,7 pages.
MacGregor, W. et al., "Multiple Control Stations in Packet Radio Networks", IEEE Military Communications Conference, Oct. 17-18, 1982, 10.3-1-10.3-5.
Markwalter, Brian et al., "CEBus Network Layer Description", IEEE, Jun. 9, 1989, 571-575.
Newtown, Harry, Newton 's Telecom Dictionary, Flatiron Publishing, Inc., 1 10th Ed., No Month Available, 1996, LAN (1 of 1): Cebus Overview (1-3): Cebus Industry Council (1 of 1).
Newtown, Harry, Newton's Telecom Dictionary, 10th Edition, No Month Available, 1996, 243.
Norenkov, et al., Telecommunication Technologies and Networks, Moscow Bauman Technical School, 1988, (Signed for publication on Dec. 10, 1997), pp. 116-118, 80-87 [I] English Language Abstract Provided.
Pollini, G.P. et al., "Path Optimization Procedures for Efficient Routing of Information after an Inter-Switch Handover", IEEE, No Month Available 1994, 1-5.
Rajagopalan, B. et al., A New Responsive Distributed Shortest-Path Routing Algorithm, ACM, No Month Available 1989,237-246.
Rappaport, T. S., "Wireless Communications, Principles and Practice," Prentice Hall PTR, No Month Available, 1996, pp. 4 10-4 13.
Shacham, N. et al., "Future Directions in Packet Radio Technology", IEEE Infocom Proceedings, Mar. 26-28, 1985,93-98.
Shachan, N. et al., "A Packet Radio Network for Library Automation", IEEE Military Communications Conference, Oct. 19-22, 1987,2,2 1.3.1-2 1.3.7.
Wescott, J. et al., "A Distributed Routing Design for a Broadcast Environment", IEEE Military Communications Conference, Oct. 17-20, 1982, 10.4-1-10.4-5.
Westcott, J.A., "Issues in Distributed Routing for Mobile Packet Radio Networks", IEEE, No Month Available 1982,233-238.
"SATEC and Virtual Extension to deploy challenging Wireless Water AMR/AMI Metering Solution. Mamilla modern urban project in Jerusalem to benefit from Diverse Path Mesh Technology", http://www.industrial-embedded.com/news/db/?10562, accessed Nov. 13, 2008.
Costa et al., "Distributed Weighted-Multidimensional Scaling for Node Localization in Sensor Networks," ACM Transactions on Sensor Networks, Feb. 2006, vol. 2, No. 1, pp. 39-64.
Jeong et al., "Empirical Analysis of Transmission Power Control Algorithms for Wireless Sensor Networks", Electrical Engineering and Computer Sciences University of California at Berkeley, Technical Report No. UCB/EECS-2005-16, http://www.eecs.berkeley.edu/Pubs/TechRpts/2005/EECS-2005-16.html, Nov. 21, 2005, 18 pages.
Maleysson et al., "Configuring and managing a large-scale monitoring network Solving real world challenges for Ultra Low Powered and long-range wireless mesh networks," Coronis Systems, Oct. 2005, pp. 225-230.
Dam "An Adaptive Energy-Efficient MAC Protocol for Wireless Sensor Networks", Paper, Delft University of Technology, Jun. 2003, 50 pages.
Sundararaman et al., "Clock Synchronization for Wireless Sensor Networks: A Survey", Elsevier, Ad Hoc Networks 3, 2005, 281-232.
Ye et al "An Energy-Efficient MAC Protocol for Wireless Sensor Networks", IEEE Infocom, 2002, 10 pages.
U.S. Appl. No. 13/186,645: Non-Final Office Action, dated Feb. 28, 2013, 26 pages.
U.S. Appl. No. 13/186,645: Final Office Action, dated Sep. 6, 2013, 23 pages.

* cited by examiner

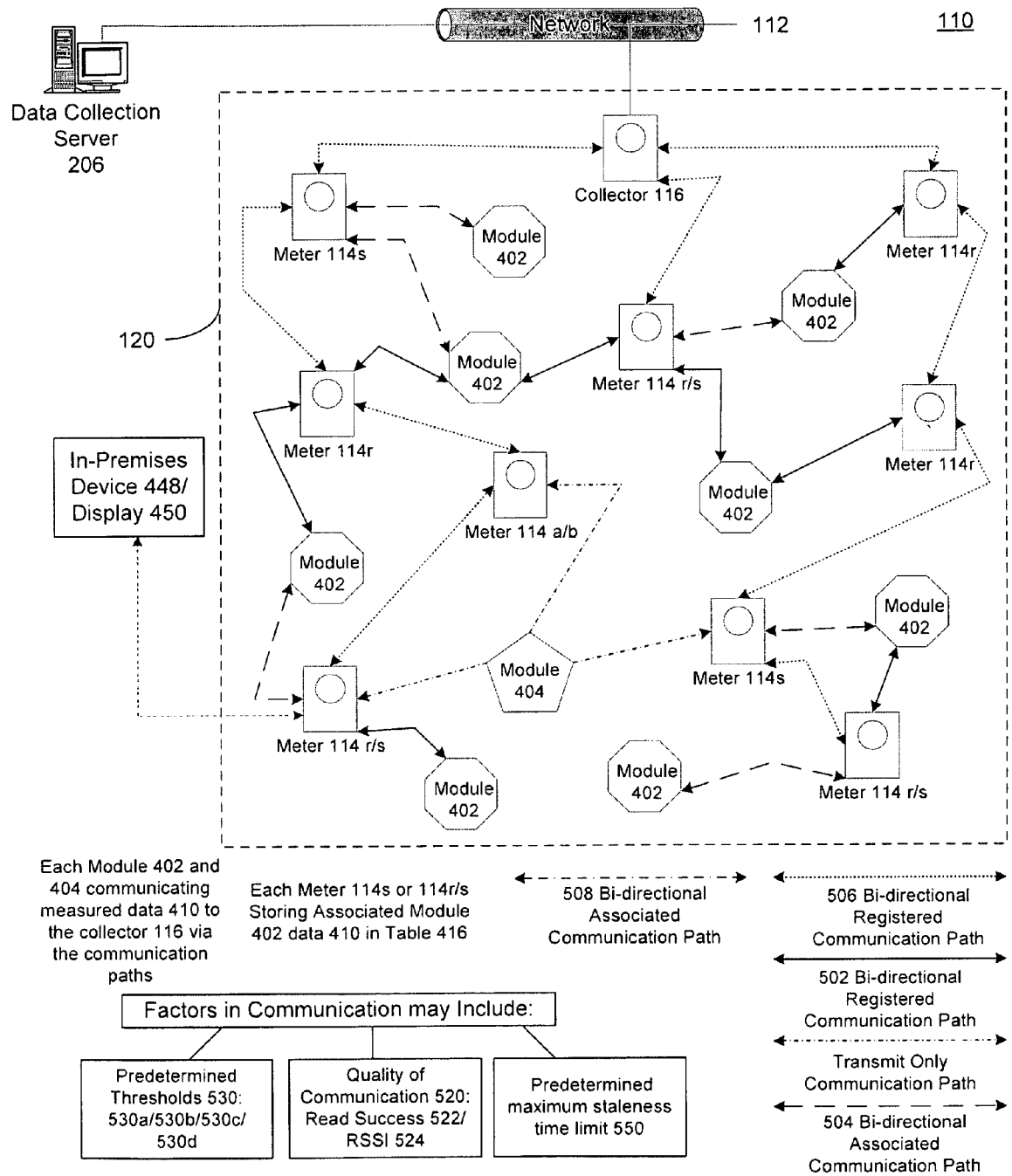

OPTIMIZED DATA COLLECTION IN A WIRELESS FIXED NETWORK METERING SYSTEM

CROSS-REFERENCE TO RELATED APPLICATIONS

This application claims the benefit of U.S. Provisional Patent Application No. 61/016,767, titled "Optimized Data Collection in a Wireless Fixed Network Metering System", filed on Dec. 26, 2007, which is hereby incorporated by reference in its entirety. This application is related to co-pending U.S. patent application Ser. No. 11/610,546, titled "Optimization Of Redundancy And Throughput In An Automated Meter Data Collection System Using A Wireless Network", filed on Dec. 14, 2006, which is hereby incorporated by reference in its entirety.

BACKGROUND OF THE INVENTION

Automated systems exist for collecting data from meters that measure usage of resources, such as gas, water and electricity. Some automated systems obtain data from such meters using a wireless network, that includes, for example, a central node in communication with a number of nodes (i.e., meters). Often, the wireless communications circuitry is incorporated into the meters themselves, such that each node in the wireless network comprises a meter having wireless communication circuitry that enables the meter to transmit its meter data. Electricity meters in such a network typically have wireless communication circuitry that permits the meter to both transmit and receive information to/from the central node. Such meters, or nodes, are referred to as bi-directional communication nodes. Bi-directional nodes are able to both transmit meter data to the central node and to receive data and instructions from the central node. In a network employing bi-directional nodes, nodes that are not within communication range of the central node may have their meter data relayed to the central node by one or more intermediate bi-directional nodes which serve as repeaters for the meter data of the transmitting node. Some networks operating in this manner are referred to as "mesh" networks.

Some meters, however, such as many water and gas meters, are only capable of transmitting meter data; they are not capable of receiving information or instructions from a wireless node. Such "one-way" nodes must always depend on the bi-directional nodes in the network to relay their meter data to the central node. An exemplary wireless network employing such nodes is depicted in FIG. 1.

As shown, central node 116 collects and stores data from a number of meters (i.e., nodes). Bi-directional nodes 221-231 may include bidirectional transmitting and receiving devices with a wireless communication path to the central node 116 that is either a direct path or an indirect path through one or more intermediate bi-directional nodes serving as relay nodes. For example, bi-directional nodes 221 and 222 have direct communications paths to central node 116, while bi-directional nodes 223-231 have indirect communications paths to central node 116 through one or more intermediate nodes. In some networks (such as the exemplary network shown in FIG. 1), each bidirectional node 221-231 has a single, designated path to the central node 116, while, in other networks, multiple dynamic paths may exist between each bidirectional node and the central node. In networks where each bidirectional node 221-231 has only a single, designated path to the central node 116, only those nodes along the designated path will relay a message from the node with that designated path. In other networks, multiple bi-directional nodes may relay, or retransmit, a message from a given node.

So-called "one-way" or "transmit-only" nodes 251-256 may include transmit-only meters such as water or gas meters. The transmit-only nodes 251-256 may gather and transmit meter data that is then relayed by one or more bidirectional nodes 221-231 to the central node 116. The system depends on the transmissions from a transmit-only device being received by at least one bidirectional node and then relayed through the network to the central node 116. Each bidirectional node may be within range and capable of receiving meter data directly from multiple transmit-only nodes. For example, bidirectional node 228 is capable of receiving meter data directly from transmit-only nodes 252-254. Consequently, the meter data transmitted by a given transmit-only node may be received by multiple bi-directional nodes and thus relayed through the network to the central node multiple times.

An advantage of the above described system is that it provides redundancy with respect to the transmission of meter data from the transmit-only meters to the central node. Specifically, because each transmit-only node may be in direct communication range of several different bidirectional nodes, multiple different communications paths may exist from each transmit-only node to the collector. For example, transmit-only node 253 may transmit its meter data to the central node 116 via a first communications path (253>227>223>221>116), a second communications path (253>228>224>222>116), or a third communications path (253>229>225>222>116). These multiple communications paths are advantageous because, even if one or more of the bidirectional nodes are not functioning properly, there is still a high probability that the meter data will be successfully relayed from the transmit-only node to the central node. For example, even if node 227 is not functioning properly, thereby rendering unsuccessful the first communications path described above, transmit-only node 253 can still successfully transmit its meter data to the central node 116 via the second or third communications paths.

While redundancy can help to provide successful data transmission, too much redundancy can be problematic because it results in too many bidirectional nodes transmitting the same meter data back to the central node. This places an unnecessary burden on the system from an overall communications traffic point of view, and this problem is exacerbated when meters are located several hop distances away from the central node. In some networks, the bidirectional meters are only allocated a fixed time period (e.g., an "exception" time) in which to relay all of their meter data to the central node. When a bidirectional meter has received meter data from a large number of transmit-only nodes, it is possible that the bidirectional meter will need to relay more data than it is able to transmit within the fixed time period. If the bidirectional meters cannot relay all of their meter data within the fixed time period, then separate individual "polled" requests may need to be issued by the central node to retrieve the excess meter data.

Thus, there is a need for a more efficient mechanism for obtaining meter data from what have traditionally been transmit-only devices, such as battery powered devices like water and gas meters, to be received and propagated through the network to the central node. It would also be useful to provide a consumer with in-premises monitoring of the electricity, gas, water, and other commodities measured by such meters for which the consumer will be billed.

SUMMARY OF THE INVENTION

The embodiments are directed to a two-way communication module for battery or other low powered devices, such as gas and water meters, as well as methods for collecting metering data from such devices. The methods and systems described below may enable reduction in the amount of network traffic generated by gas and water meter devices.

According to one embodiment, the gas and water meter devices have transceivers instead of just transmitters and this enables an association to be established between given gas or water devices and certain electric meters. By making this association, redundant communications may be reduced.

In another embodiment, a method may be performed by one electricity meter in a wireless network. The wireless network may comprise a collector and a plurality of electricity meters that measure consumption of electricity and that bi-directionally communicate wirelessly with the collector to transmit information about measured consumption of electricity to the collector. Each of the electricity meters may have a wireless communication path to the collector that is either a direct communication path to the collector or an indirect communication path through one or more other electricity meters that serve as repeaters. The electricity meter may have an established association with at least one battery-powered meter that measures consumption of a commodity other than electricity. The method may comprise receiving information about measured consumption of the other commodity from the associated battery-powered meter and storing the received information. The method may also include transmitting both the information about consumption of electricity measured by the at least one electricity meter and the information about consumption of the other commodity received from the associated battery-powered meter to the collector via the wireless network. The method may also include transmitting both the information about consumption of electricity measured by the at least one electricity meter and the information about consumption of the other commodity received from the associated battery-powered meter to a remotely located display associated with the electricity meter.

In some embodiments, the two-way transceiver may also allow the presentation of water and gas metering data on in-premise devices such as a display. This feature allows for the association of water or gas metering data to a given electricity meter and the means whereby the electricity meter can communicate the information to devices inside the home. However, the mechanisms presented are not limited to gas and water metering devices and would apply to other types of devices communicating to electricity meters or to devices in the home.

In an embodiment, a method may be performed by a battery-powered meter in a wireless network in which the battery-powered meter measures consumption of a commodity other than electricity. The wireless network may comprise a collector and a plurality of electricity meters that measure consumption of electricity and that bi-directionally communicate wirelessly with the collector to transmit information about measured consumption of electricity to the collector. Each of the electricity meters may have a wireless communication path to the collector that is either a direct communication path to the collector or an indirect communication path through one or more other electricity meters that serve as repeaters. The method may comprise communicating information about consumption of the other commodity measured by the battery-powered meter to an electricity meter with which an association has been established. The associated electricity meter can supply the consumption information measured by the battery-powered meter to a remote display associated with that associated electricity meter. The battery-powered meter may establish communication with at least one other electricity meter and communicate its measured commodity consumption information to that other electricity meter upon determining that a quality of the communication with the associated electricity meter has fallen below a first predetermined threshold.

In an embodiment, a method of communication may be performed by a battery-powered meter in a wireless network that measures consumption of a commodity other than electricity. The wireless network may comprise a collector and a plurality of electricity meters that measure consumption of electricity and that bi-directionally communicate wirelessly with the collector to transmit information about measured consumption of electricity to the collector. Each of the electricity meters may have a wireless communication path to the collector that is either a direct communication path to the collector or an indirect communication path through one or more other electricity meters that serve as repeaters. The method may comprise receiving a communication from a first meter and a second meter of the plurality of electricity meters and determining a quality of communication with the first meter and determining a quality of communication with the second meter. The method may include determining a first value based on the quality of communication with the first meter and the quality of communication with the second meter. The method may include comparing the first value with a first predetermined threshold and a second predetermined threshold. The method may include establishing exclusive bi-directional communication with the first meter and the second meter upon the first value meeting or exceeding the first predetermined threshold and the first value falling below the second predetermined threshold. The exclusive bi-directional communication may include no more of the plurality of electricity meters than the first meter and the second meter.

In an embodiment, a wireless network may comprise a collector and a plurality of electricity meters that measure consumption of electricity and that bi-directionally communicate wirelessly with the collector to transmit information about measured consumption of electricity to the collector. Each of the electricity meters may have a wireless communication path to the collector that is either a direct communication path to the collector or an indirect communication path through one or more other electricity meters that serve as repeaters. The wireless network may include a remotely located display that is associated with one of the electricity meters and a battery-powered meter that measures consumption of a commodity other than electricity. An association may be established between the electricity meter and the battery-powered meter. The electricity meter may receive information about measured consumption of the other commodity from the associated battery-powered meter and store the received information. The electricity meter may transmit both information about consumption of electricity measured by it and the information about consumption of the other commodity received from the associated battery-powered meter to the collector via the wireless network. The electricity meter may transmit both information about consumption of electricity measured by it and the information about consumption of the other commodity received from the associated battery-powered meter to the remotely located display.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 2A is a diagram of other aspects of the exemplary metering system of FIG. 2;

DETAILED DESCRIPTION OF ILLUSTRATIVE EMBODIMENTS

Figure 1:
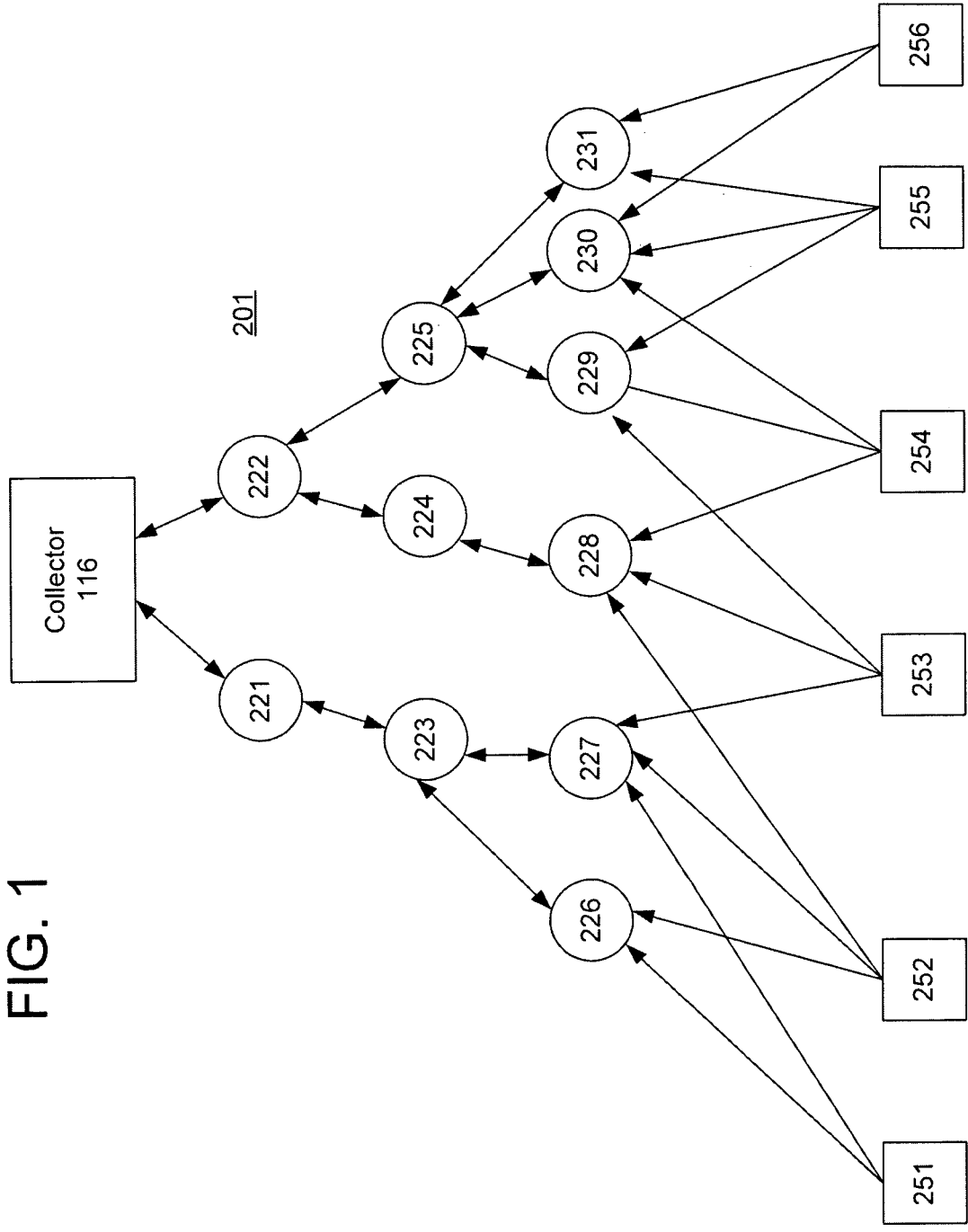
FIG. 1 is a diagram of an exemplary subnet of a wireless network for collecting data from remote devices.

One example of a metering system 110 in which the embodiments may be employed is illustrated in FIGS. 2, 2A, 3, and 4A-B. The description given herein with respect to those figures is for exemplary purposes only and is not intended in any way to limit the scope of potential embodiments.

System 110 comprises a plurality of meters 114 (including 114a and 114b) and 400 which are operable to sense and record consumption or usage of a service, resource, or commodity such as, for example, electricity, water, or gas. A meter 400 may be a battery-powered meter used primarily for commodities like gas and water. Meters 114 and 400 may be located at customer premises such as, for example, a home or place of business. Meters 114 and 400 may comprise circuitry for measuring the consumption of the service or commodity being consumed at their respective locations and for generating data 410 reflecting the consumption, as well as other data related thereto (which may be included in data 410). Meters 114 and 400 may also comprise circuitry for wirelessly transmitting data generated by the meter 114 or 400 to a remote location. Meters 114 may further comprise circuitry for receiving data, commands or instructions wirelessly as well.

Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Electricity, LLC and marketed under the tradename REX. A meter 400 may include a transceiver 404 that may allow for the transmission (one-way communication) of the meter data 410 from the transceiver 404 to the subnet 120 via other two-way nodes such as meters 114. A meter 400 may, in the alternative, include a transceiver 402 that may allow for bi-directional or two-way communication between the transceiver 402 and the subnet 120 via other two-way nodes such as meters 114. A meter 400 with a module 404 may be referred to as a module 404. Also, a meter 400 with a module 402 may be referred to as a module 402.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114 and 400. Thus, like the meters 114 and 400, the collectors 116 may comprise both circuitry for measuring the consumption of a service or commodity and for generating data 410 reflecting the consumption and circuitry for transmitting and receiving data. In one embodiment, collector 116 and meters 114 and 400 communicate with and amongst one another using any one of several wireless techniques such as, for example, frequency hopping spread spectrum (FHSS) and direct sequence spread spectrum (DSSS). In other embodiment, collectors 116 may not also operate as meter, but rather may only perform the data collection function described herein.

A collector 116 and the meters 114 and 400 with which it communicates define a subnet/LAN 120 of system 110. As used herein, meters 114 and 400 and collectors 116 may be referred to as "nodes" in the subnet 120. In each subnet/LAN 120, each meter transmits data 410 related to consumption of the commodity being metered at the meter's location. The collector 116 receives the data 410 transmitted by each meter 114 and 400, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, or any combination of the above.

Figure 3:
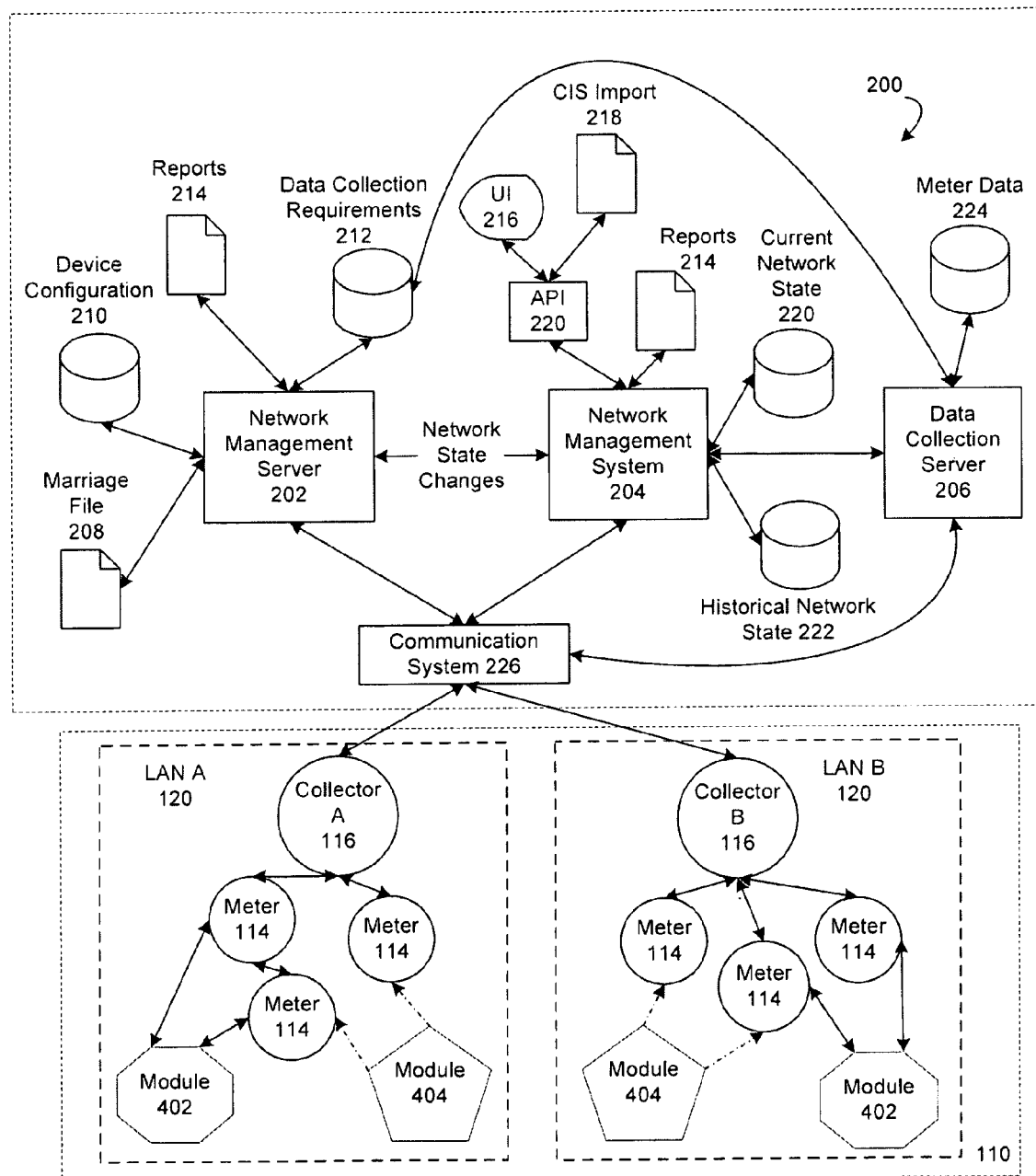
FIG. 3 expands upon the diagrams of FIG. 2 and FIG. 2A and illustrates an exemplary metering system in greater detail.

Referring now to FIG. 3, further details of the metering system 110 are shown. Typically, the system will be operated by a utility company or a company providing information technology services to a utility company. As shown, the system 200 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114, transceiver modules 402 and 404 for meters 400 (which may be referred to as either a module 402 or a module 404), and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114, modules 402 and 404, and collectors 116 communicating in the system 110. A data collection requirements database 212 contains information regarding the data 410 to be collected on a per node basis. For example, a utility may specify that metering data 410 such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering data 410, such as energy consumption, and may be used for billing purposes, etc. by a utility provider.

The network management server 202, network management system 204 and data collection server 206 communicate with the nodes in each subnet/LAN 120 via network 110.

Figure 4A:
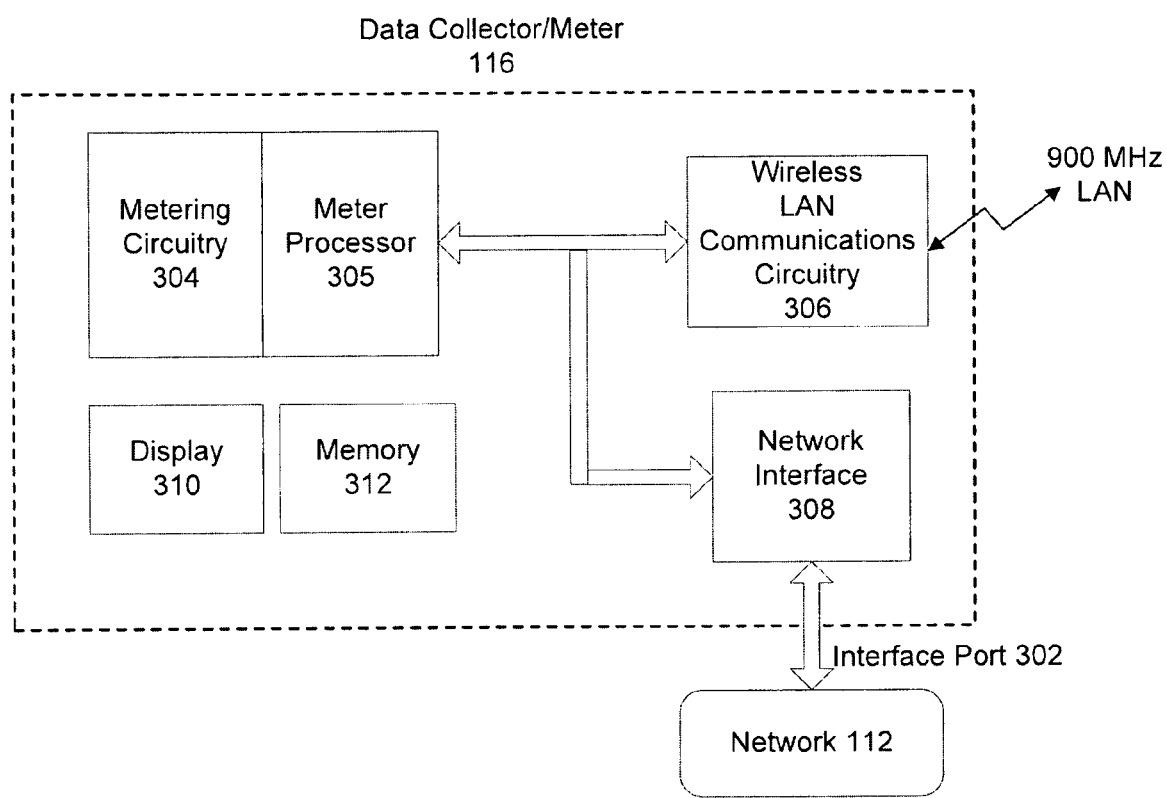
FIG. 4A is a block diagram illustrating an exemplary collector.

FIG. 4A is a block diagram illustrating further details of one embodiment of a collector 116. Although certain components are designated and discussed with reference to FIG. 3A, it should be appreciated that the invention is not limited to such components. In fact, various other components typically found in an electronic meter may be a part of collector 116, but have not been shown in FIG. 3A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 4A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 and modules 402 and 404 in a subnet/LAN and a network interface 308 for communication over the network 112.

In one embodiment, the metering circuitry 304, processor 305, display 310 and memory 312 are implemented using an A3 ALPHA meter available from Elster Electricity, Inc. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114 and modules 402 and 404. Also, LAN Option Board 306 may have sufficient memory to store data 410 received from meters 114 and modules 402 and 404. This data 410 may include, but is not limited to the following: current billing data (e.g., the present values stored and displayed by meters 114 and modules 402 and 404), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

In one embodiment, the LAN Option Board 306 employs a CC1110 chip available from Texas Instruments, Inc. to implement its wireless transceiver functionality. The CC1110 chip has a built-in Received Signal Strength Indication (RSSI) capability that provides a measurement of the power present in a received radio signal.

Generally, the collector 116 is responsible for managing, processing and routing data communicated between the collector and network 112 and between the collector and meters 114 and modules 402 and 404. Collector 116 may continually or intermittently read the current data 410 from meters 114 and modules 402 and 404 and store the data 410 in a database (not shown) in collector 116. Such current data 410 may include but is not limited to the total kWh usage, the Time-Of-Use (TOU) kWh usage, peak kW demand, and other energy consumption measurements and status information. Collector 116 also may read and store previous billing and previous season data from meters 114 and modules 402 and 404 and store the data in the database in collector 116. The database may be implemented as one or more tables of data within the collector 116.

Figure 2:
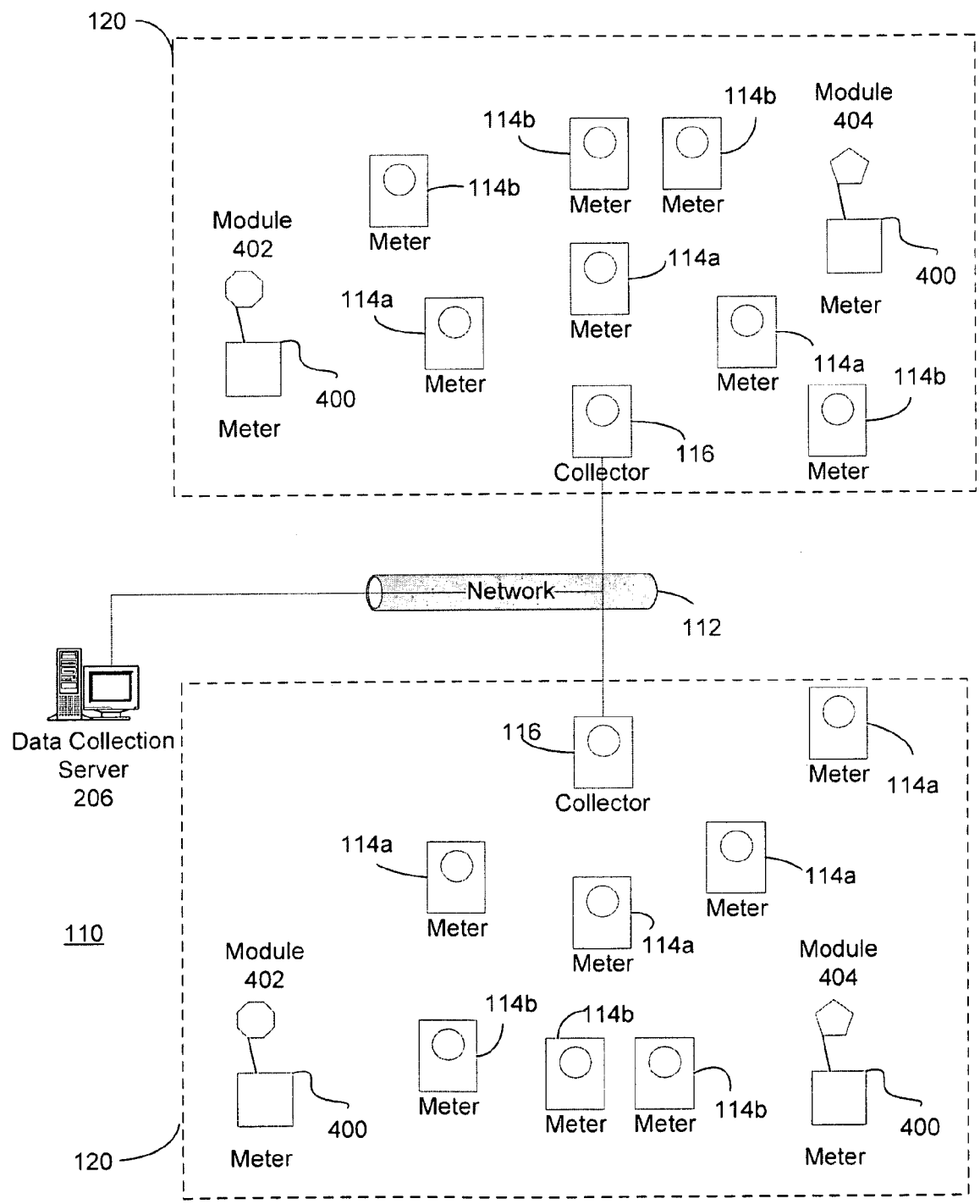
FIG. 2 is a diagram of an exemplary metering system.
Figure 4B:
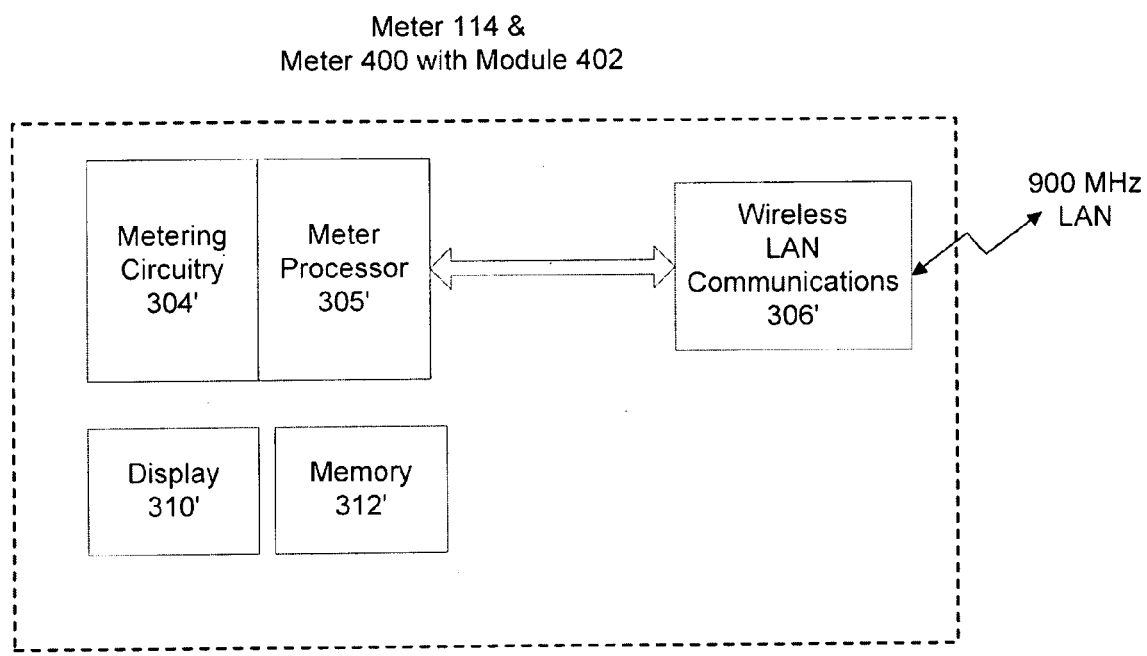
FIG. 4B is a block diagram illustrating an exemplary meter and an exemplary battery-powered meter with a communication module consistent with aspects of an embodiment.
Figure 5:
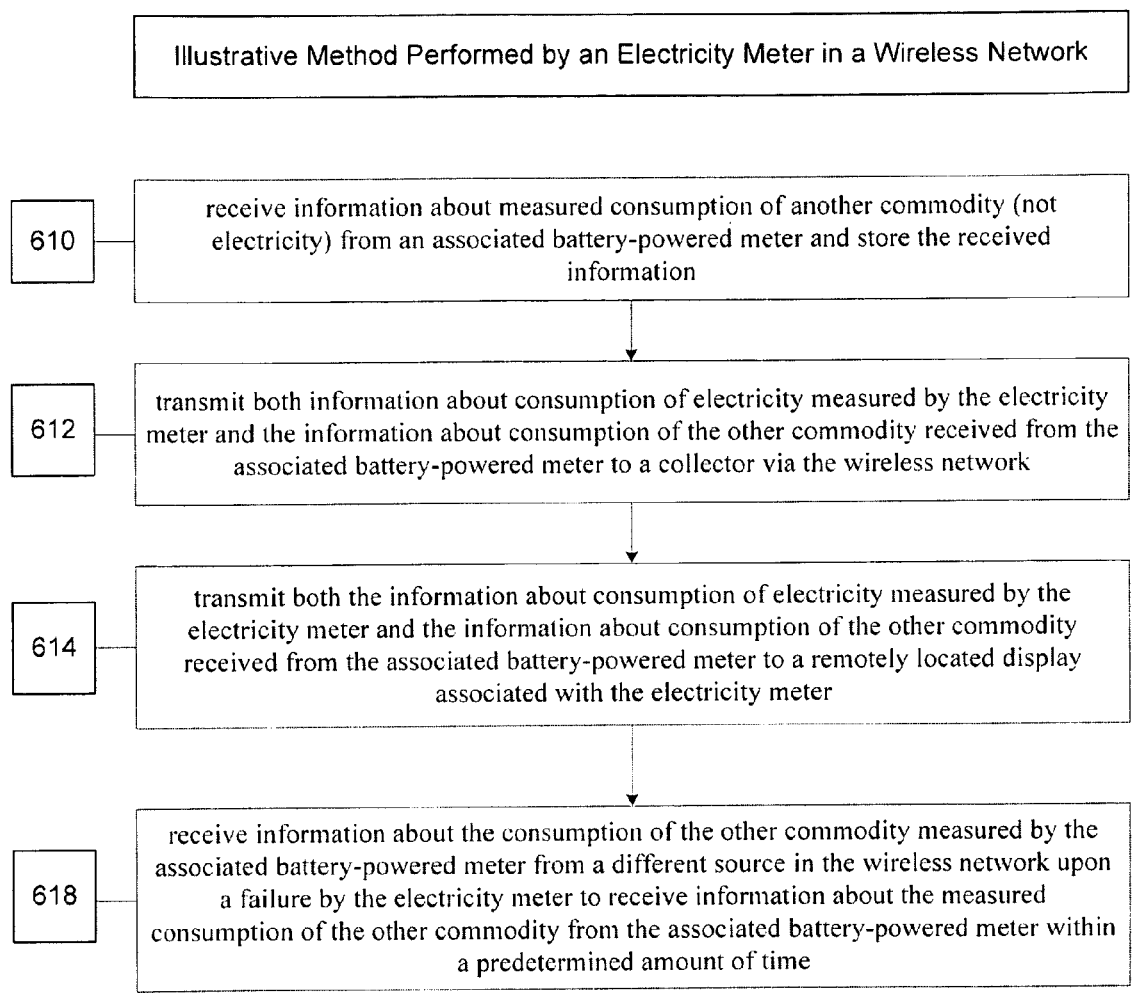
FIG. 5 is a flowchart illustrating an exemplary process embodiment.

FIG. 4B is a block diagram of an exemplary embodiment of a meter 114 and a meter 400 with a two-way transceiver module 402 that may operate in the system 110 of FIGS. 2 and 3. As shown, the meter 114 and meter 400 with a module 402 may comprise metering circuitry 304' for measuring the amount of a service or commodity that is consumed, a processor 305' that controls the overall functions of the meter, a display 310' for displaying meter data 410 and status information, and a memory 312' for storing data and program instructions. The meter 114 and meter 400 with module 402 may further comprise wireless communications circuitry 306' for transmitting and receiving data to/from other meters 114 or a collector 116. The wireless communication circuitry 306' may comprise, for example, the aforementioned CC1110 chip available from Texas Instruments, Inc.

Referring again to FIG. 2, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120. Modules 402 and 404 may also be in a "one hop" position, or any number of hops from the collector 116, but modules 402 and 404 may not serve as repeaters for other nodes as the meters 114 may.

Each level one meter 114a typically will only be in range to directly communicate with a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 2, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114, module 402 and 404, and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 and module 402 and 404 (via meters 114) therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 and modules 402 in the subnet 120 using point-to-point transmissions. For example, a message or instruction from collector 116 is routed through the designated set of repeaters to the desired meter 114 or module 402. Similarly, a meter 114 or module 402 may communicate with collector 116 through the same set of repeaters, but in reverse.

In some instances, however, collector 116 may need to quickly communicate information to all meters 114 and modules 402 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Modules 402 receive the flood broadcast message via whatever level meter 114 with which the module 402 is in communication. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may rebroadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 and modules 402 may have a clock formed therein. However, meters 114 and modules 402 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 and modules 402 in subnet 120. Meters 114 and modules 402 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to the data collection server 206, but are not so urgent that they need to be communicated immediately. For example, when the collector 116 registers a new meter 114 in subnet 120, the collector 116 records a daily exception identifying that the registration has taken place. In an illustrative embodiment, the exception is recorded in a database table referred to as the "Daily Exception Log Table." The collector 116 communicates the daily exceptions to the data collection server 206. Generally, the collector 116 communicates the daily exceptions once every 24 hours. Critical exceptions may be immediately transmitted In an embodiment, a collector 116 may assign designated registered communications relationships 506 (or 506 paths) to meters 114, and may change the communication relationship 506 paths for previously registered meters 114 if conditions warrant. For example, when a collector 116 is initially brought into system 110, it needs to identify and register meters 114 in its subnet 120. A "node scan" refers to a process of communication between a collector 116 and meters 114 whereby the collector may identify and register new nodes 114 in a subnet 120 and allow previously registered nodes 114 to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data 410. The collector 116 initiates a node scan by broadcasting a request, which may be referred to as a Node Scan Procedure request. Generally, the Node Scan Procedure request directs that all unregistered meters 114 that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter 114 from which the collector 116 receives a response to the Node Scan Procedure request, the collector 116 tries to qualify the registered communications relationship 506 path to that meter 114 before registering the meter 114 with the collector 116. That is, before registering a meter, the collector 116 attempts to determine whether data communications with the meter 114 will be sufficiently reliable. In one embodiment, the collector 116 determines whether the registered communications relationship 506 path to a responding meter 114 is sufficiently reliable by comparing a quality of communication 520 value, such as a Received Signal Strength Indication (RSSI) 524 value (i.e., a measurement of the received radio signal strength) measured with respect to the received response from the meter 114 to a selected predetermined threshold value. For example, the threshold value may be −60 dBm. RSSI 524 values above this threshold would be deemed sufficiently reliable. In another embodiment, qualification is performed by transmitting a predetermined number of additional packets to the meter, such as ten packets, and counting the number of acknowledgements received back from the meter. This quality of communication 520 value may be referred to as a read success average (or rate) 522. If the number of acknowledgments received is greater than or equal to a selected predetermined threshold (e.g., 8 out of 10), then the path is considered to be reliable. In other embodiments, a combination of the two qualification techniques may be employed.

If the qualification threshold is not met, the collector 116 may add an entry for the meter 114 to a "Straggler Table." The entry includes the meter's LAN ID, its qualification score (e.g., 5 out of 10; or its RSSI 524 value), its level (in this case level one) and the unique ID of its parent (in this case the collector's ID).

If the qualification threshold is met or exceeded, the collector 116 registers the node 114. Registering a meter 114 comprises updating a list of the registered nodes at collector 116. For example, the list may be updated to identify the meter's system-wide unique identifier and the registered communication relationship 506 path to the node 114. Collector 116 also records the meter's 114 level in the subnet 120 (i.e. whether the meter is a level one node, level two node, etc.), whether the node 114 operates as a repeater, and if so, the number of meters 114 for which it operates as a repeater. The registration process further comprises transmitting registration information to the meter 114. For example, collector 116 forwards to meter 114 an indication that it is registered, the unique identifier of the collector with which it is registered, the level the meter 114 exists at in the subnet 120, and the unique identifier of its parent meter 114 that will server as a repeater for messages the meter 114 may send to the collector. In the case of a level one node, the parent is the collector 116 itself. The meter 114 stores this data and begins to operate as part of the subnet 120 by responding to commands from its collector 116.

Qualification and registration continues for each meter 114 that responds to the collector's 116 initial Node Scan Procedure request. The collector 116 may rebroadcast the Node Scan Procedure additional times so as to insure that all meters 114 that may receive the Node Scan Procedure have an opportunity for their response to be received and the meter 114 qualified as a level one node at collector 116.

The node scan process then continues by performing a similar process as that described above at each of the now registered level one nodes 114. This process results in the identification and registration of level two nodes 114. After the level two nodes 114 are identified, a similar node scan process is performed at the level two nodes 114 to identify level three nodes, and so on.

Specifically, to identify and register meters 114 that will become level two meters 114, for each level one meter 114, in succession, the collector 116 transmits a command to the level one meter 114, which may be referred to as an "Initiate Node Scan Procedure" command. This command instructs the level one meter 114 to perform its own node scan process. The request comprises several data items that the receiving meter 114 may use in completing the node scan. For example, the request may comprise the number of timeslots available for responding nodes 114, the unique address of the collector 116 that initiated the request, and a measure of the reliability of the communications between the target node 114 and the collector 116. As described below, the measure of reliability may be employed during a process for identifying more reliable registered communication relationship 506 paths for previously registered nodes 114.

The meter 114 that receives the Initiate Node Scan Response request responds by performing a node scan process similar to that described above. More specifically, the meter 114 broadcasts a request to which all unregistered nodes 114 may respond. The request comprises the number of timeslots available for responding nodes 114 (which is used to set the period for the node to wait for responses), the unique address of the collector 116 that initiated the node scan procedure, a measure of the reliability of the communications between the sending node 114 and the collector 116 (which may be used in the process of determining whether a meter's 114 path may be switched as described below), the level within the subnet 120 of the node 114 sending the request, and an RSSI 524 threshold (which may also be used in the process of determining whether a registered meter's 114 path may be switched). The meter 114 issuing the node scan request then waits for and receives responses from unregistered nodes 114. For each response, the meter 114 stores in memory the unique identifier of the responding meter 114. This information is then transmitted to the collector 116.

For each unregistered meter 114 that responded to the node scan issued by the level one meter 114, the collector 116 attempts again to determine the reliability of the communication path to that meter 114. In one embodiment, the collector 116 sends a "Qualify Nodes Procedure" command to the level one node 114 which instructs the level one node to transmit a predetermined number of additional packets to the potential level two node and to record the number of acknowledgements received back from the potential level two node. This qualification score (e.g., 8 out of 10), which is a read success average (or rate) 522, is then transmitted back to the collector 116, which again compares the score to a qualification predetermined threshold. In other embodiments, other measures of the communications reliability, or a quality of communication 520 may be provided, such as an RSSI 524 value.

If the qualification threshold is not met, then the collector 116 adds an entry for the node 114 in the Straggler Table, as discussed above. However, if there already is an entry in the Straggler Table for the node 114, the collector 116 will update that entry only if the qualification score for this node scan procedure is better than the recorded qualification score from the prior node scan that resulted in an entry for the node 114.

If the qualification threshold is met or exceeded, the collector 116 registers the node 114. Again, registering a meter 114 at level two comprises updating a list of the registered nodes at collector 116. For example, the list may be updated to identify the meter's 114 unique identifier and the level of the meter 114 in the subnet 120. Additionally, the collector's 116 registration information is updated to reflect that the meter 114 from which the scan process was initiated is identified as a repeater (or parent) for the newly registered node 114. The registration process further comprises transmitting information to the newly registered meter 114 as well as the meter 114 that will serve as a repeater for the newly added node 114. For example, the node 114 that issued the node scan response request is updated to identify that it operates as a repeater and, if it was previously registered as a repeater, increments a data item identifying the number of nodes 114 for which it serves as a repeater. Thereafter, collector 116 forwards to the newly registered meter 114 an indication that it is registered, an identification of the collector 116 with which it is registered, the level the meter 114 exists at in the subnet 120, and the unique identifier of the node 114 that will serve as its parent, or repeater, when it communicates with the collector 116.

The collector 116 then performs the same qualification procedure for each other potential level two node 114 that responded to the level one node's 114 node scan request. Once that process is completed for the first level one node 114, the collector 116 initiates the same procedure at each other level one node 114 until the process of qualifying and registering level two nodes 114 has been completed at each level one node 114. Once the node scan procedure has been performed by each level one node 114, resulting in a number of level two nodes 114 being registered with the collector 116, the collector 116 will then send the Initiate Node Scan Response command to each level two node 114, in turn. Each level two node 114 will then perform the same node scan procedure as performed by the level one nodes 114, potentially resulting in the registration of a number of level three nodes 114. The process is then performed at each successive node, until a maximum number of levels is reached (e.g., seven levels) or no unregistered nodes 114 are left in the subnet 120.

It will be appreciated that in the present embodiment, during the qualification process for a given node 114 at a given level, the collector 116 qualifies the last "hop" only. For example, if an unregistered node 114 responds to a node scan request from a level four node 114, and therefore, becomes a potential level five node 114, the qualification score for that node is based on the reliability of communications between the level four node 114 and the potential level five node 114 (i.e., packets transmitted by the level four node 114 versus acknowledgments received from the potential level five node 114), not based on any measure of the reliability of the communications over the full path from the collector 116 to the potential level five node 114. In other embodiments, of course, the qualification score could be based on the full registered communication relationship 506 path.

At some point, each meter 114 will have an established registered communication relationship 506 path to the collector 116 which will be either a direct path (i.e., level one nodes 114) or an indirect path through one or more intermediate nodes 114 that serve as repeaters. If during operation of the network, a meter 114 registered in this manner fails to perform adequately, it may be assigned a different path or possibly to a different collector 116 as described below.

As previously mentioned, a full node scan may be performed when a collector 116 is first introduced to a network. At the conclusion of the full node scan, a collector 116 will have registered a set of meters 114 with which it communicates and reads metering data 410. Full node scans might be periodically performed by an installed collector 116 to identify new meters 114 that have been brought on-line since the last node scan and to allow registered meters 114 to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node 114, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system 110 identifies that the new meter 114 has begun operating and identifies a registered communication relationship 506 path to a collector 116 that will become responsible for collecting the metering data 410. Specifically, the new meter 114 will broadcast an indication that it is unregistered. In one embodiment, this broadcast might be, for example, embedded in, or relayed as part of a request for an update of the real time as described above. The broadcast will be received at one of the registered meters 114 in proximity to the meter 114 that is attempting to register. The registered meter 114 forwards the time to the meter 114 that is attempting to register. The registered node 114 also transmits an exception request to its collector 116 requesting that the collector 116 implement a node scan, which presumably will locate and register the new meter 114. The collector 116 then transmits a request that the registered node 114 perform a node scan. The registered node 114 will perform the node scan, during which it requests that all unregistered nodes 114 respond. Presumably, the newly added, unregistered meter 114 will respond to the node scan. When it does, the collector 116 will then attempt to qualify and then register the new node 114 in the same manner as described above.

Once a registered communication relationship 506 path between the collector 116 and a meter 114 is established, the meter 114 can begin transmitting its meter data 410 to the collector and the collector 116 can transmit data and instructions to the meter 114. As mentioned above, data is transmitted in packets. "Outbound" packets are packets transmitted from the collector to a meter 114 at a given level. In one embodiment, outbound packets contain the following fields, but other fields may also be included:

Length—the length of the packet;
SrcAddr—source address—in this case, the ID of the collector;
DestAddr—the LAN ID of the meter to which the packet addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector 116, it will only be forwarded on to the destination meter 114 by those repeater meters 114 whose identifiers appear in the RptPath field. Other meters 114 that may receive the packet, but that are not listed in the path identified in the RptPath field will not repeat the packet.

"Inbound" packets are packets transmitted from a meter 114 at a given level to the collector 116. In one embodiment, inbound packets contain the following fields, but other fields may also be included:

Length—the length of the packet;
SrcAddr—source address—the address of the meter that initiated the packet;
DestAddr—the ID of the collector to which the packet is to be transmitted;
RptAddr—the ID of the parent node that serves as the next repeater for the sending node;
Data—the payload of the packet;

Because each meter 114 knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector 116. The node will then replace the RptAddr field with the identifier of its own parent and will then transmit the packet so that its parent will receive it. This process will continue through each repeater at each successive level until the packet reaches the collector 116.

For example, suppose a meter 114 at level three initiates transmission of a packet destined for its collector 116. The level three node 114 will insert in the RptAddr field of the inbound packet the identifier of the level two node 114 that serves as a repeater for the level three node 114. The level three node 114 will then transmit the packet. Several level two nodes 114 may receive the packet, but only the level two node 114 having an identifier that matches the identifier in the RptAddr field of the packet will acknowledge it. The other node 114 will discard it. When the level two node 114 with the matching identifier receives the packet, it will replace the RptAddr field of the packet with the identifier of the level one packet that serves as a repeater for that level two packet, and the level two packet will then transmit the packet. This time, the level one node 114 having the identifier that matches the RptAddr field will receive the packet. The level one node 114 will insert the identifier of the collector 116 in the RptAddr field and will transmit the packet. The collector 116 will then receive the packet to complete the transmission.

A collector 116 periodically retrieves meter data 410 from the meters 114 that are registered with it. For example, meter data 410 may be retrieved from a meter 114 every 4 hours. Where there is a problem with reading the meter data 410 on the regularly scheduled interval, the collector 116 will try to read the data again before the next regularly scheduled interval. Nevertheless, there may be instances wherein the collector 116 is unable to read metering data 410 from a particular meter 114 for a prolonged period of time. The meters 114 store an indication of when they are read by their collector 116 and keep track of the time since their data 410 has last been collected by the collector 116. If the length of time since the last reading exceeds a defined predetermined threshold, such as for example, 18 hours, presumably a problem has arisen in the registered communication relationship 506 path between the particular meter 114 and the collector 116. Accordingly, the meter 114 changes its status to that of an unregistered meter 114 and attempts to locate a new registered communication relationship 506 path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data 410 from a meter 114 every 4 hours but is able to read the data 410, for example, only 70 percent of the time or less, it may be desirable to find a more reliable registered communication relationship 506 path for reading the data 410 from that particular meter 114. Where the frequency of reading data from a meter 114 falls below a desired frequency, the collector 116 transmits a message to the meter 114 to respond to node scans going forward. The meter 114 remains registered but will respond to node scans in the same manner as an unregistered node as described above. In other embodiments, all registered meters 114 may be permitted to respond to node scans, but a meter 114 will only respond to a node scan if the path to the collector 116 through the meter 114 that issued the node scan is shorter (i.e., less hops) than the meter's 114 current path to the collector 116. A lesser number of hops is assumed to provide a more reliable registered communication relationship 506 path than a longer path. A node scan request always identifies the level of the node 114 that transmits the request, and using that information, an already registered node 114 that is permitted to respond to node scans can determine if a potential new registered communication relationship 506 path to the collector 116 through the node 114 that issued the node scan is shorter than the node's 114 current path to the collector 116.

If an already registered meter 114 responds to a node scan procedure, the collector 116 recognizes the response as originating from a registered meter 114 but that by re-registering the meter 114 with the node that issued the node scan, the collector 116 may be able to switch the meter 114 to a new, more reliable registered communication relationship 506 path. The collector 116 may verify that the RSSI 524 value of the node scan response exceeds an established predetermined threshold. If it does not, the potential new registered communication relationship 506 path will be rejected. However, if the RSSI 524 threshold is met, the collector 116 will request that the node 114 that issued the node scan perform the qualification process described above (i.e., send a predetermined number of packets to the node and count the number of acknowledgements received). If the resulting qualification score satisfies a threshold, then the collector 116 will register the node 114 with the new registered communication relationship 506 path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter 114 previously communicated is updated to identify that it is no longer a repeater for the particular meter 114. In other embodiments, the threshold determination with respect to the RSSI 524 value may be omitted. In such embodiments, only the qualification of the last "hop" (i.e., sending a predetermined number of packets to the node and counting the number of acknowledgements received) will be performed to determine whether to accept or reject the new registered communication relationship 506 path.

In some instances, a more reliable registered communication relationship 506 path for a meter 114 may exist through a collector 116 other than that with which the meter 114 is registered. A meter 114 may automatically recognize the existence of the more reliable registered communication relationship 506 path, switch collectors, and notify the previous collector 116 that the change has taken place. The process of switching the registration of a meter 114 from a first collector 116 to a second collector 116 begins when a registered meter 114 receives a node scan request from a collector 116 other than the one with which the meter 114 is presently registered. Typically, a registered meter 114 does not respond to node scan requests. However, if the request is likely to result in a more reliable registered communication relationship 506 transmission path, even a registered meter 114 may respond. Accordingly, the meter 114 determines if the new collector 116 offers a potentially more reliable registered communication relationship 506 transmission path. For example, the meter 114 may determine if the path to the potential new collector 116 comprises fewer hops than the path to the collector 116 with which the meter 114 is registered. If not, the path may not be more reliable and the meter 114 will not respond to the node scan. The meter 114 might also determine if the RSSI 524 of the node scan packet exceeds an RSSI 524 predetermined threshold identified in the node scan information. If so, the new collector 116 may offer a more reliable registered communication relationship 506 transmission path for meter data 410. If not, the communication relationship transmission path 506 may not be acceptable and the meter 114 may not respond. Additionally, if the reliability of communication between the potential new collector 116 and the repeater that would service the meter 114 meets a predetermined threshold established when the repeater was registered with its existing collector 116, the registered communication relationship 506 path to the new collector 116 may be more reliable. If the reliability does not exceed this threshold, however, the meter 114 does not respond to the node scan.

If it is determined that the path to the new collector 116 may be better than the path to its existing collector 116, the meter 114 responds to the node scan. Included in the response is information regarding any nodes 114 for which the particular meter may operate as a repeater. For example, the response might identify the number of nodes 114 for which the meter serves as a repeater.

The collector 116 then determines if it has the capacity to service the meter 114 and any meters 114 for which it operates as a repeater. If not, the collector 116 does not respond to the meter 114 that is attempting to change collectors 116. If, however, the collector 116 determines that it has capacity to service the meter 114, the collector 116 stores registration information about the meter 114. The collector 116 then transmits a registration command to meter 114. The meter 114 updates its registration data to identify that it is now in a registered communication relationship 506 with the new collector 116. The collector 116 then communicates instructions to the meter 114 to initiate a node scan request. Nodes that are unregistered, or that had previously used meter 114 as a repeater respond to the request to identify themselves to collector 116. The collector 116 registers these nodes 114 as is described above in connection with registering new meters/nodes.

Under some circumstances it may be necessary to change a collector 116. For example, a collector 116 may be malfunctioning and need to be taken off-line. Accordingly, a new registered communication relationship 506 path must be provided for collecting meter data 410 from the meters 114 serviced by the particular collector 116. The process of replacing a collector 116 is performed by broadcasting a message to unregister, usually from a replacement collector 116, to all of the meters 114 that are registered with the collector 116 that is being removed from service. In one embodiment, registered meters 114 may be programmed to only respond to commands from the collector 116 with which they are registered. Accordingly, the command to unregister may comprise the unique identifier of the collector 116 that is being replaced. In response to the command to unregister, the meters 114 begin to operate as unregistered meters and respond to node scan requests. To allow the unregistered command to propagate through the subnet 120, when a node 114 receives the command it will not unregister immediately, but rather remain registered for a defined period, which may be referred to as the "Time to Live". During this time to live period, the nodes 114 continue to respond to application layer and immediate retries allowing the unregistration command to propagate to all nodes 114 in the subnet 120. Ultimately, the meters 114 register with the replacement collector 116 using the procedure described above.

One of collector's 116 main responsibilities within subnet 120 is to retrieve metering data 410 from meters 114 and modules 402. In one embodiment, collector 116 may have as a goal to obtain at least one successful read of the metering data 410 per day from each node 114 and 402 in its subnet 120. Collector 116 attempts to retrieve the data 410 from all nodes 114 and 402 in its subnet 120 at a configurable periodicity. For example, collector 116 may be configured to attempt to retrieve metering data 410 from meters 114 and modules 402 in its subnet 120 once every 4 hours. In greater detail, in one embodiment, the data collection process begins with the collector 116 identifying one of the meters 114 or modules 402 in its subnet 120. For example, the collector 116 may review a list of registered nodes 114 or 402 and identify one for reading. The collector 116 then communicates a command to the particular meter 114 or module 402 that it forward its metering data 410 to the collector 116. If the meter reading is successful and the data 410 is received at collector 116, the collector 116 determines if there are other meters 114 or modules 402 that have not been read during the present reading session. If so, processing continues. However, if all of the meters 114 and modules 402 in subnet 120 have been read, the collector 116 waits a defined length of time, such as, for example, 4 hours, before attempting another read.

If during a read of a particular meter 114 or module 402, the meter data 410 is not received at collector 116, the collector 116 begins a retry procedure wherein it attempts to retry the data 410 read from the particular meter 114 or module 402. Collector 116 continues to attempt to read the data from the node 114 or 402 until either the data 410 is read or the next subnet 120 reading takes place. In an embodiment, collector 116 attempts to read the data 410 every 60 minutes. Thus, wherein a subnet 120 reading is taken every 4 hours, collector 116 may issue three retries between subnet 120 readings.

As mentioned in the Background section above, in existing metering systems, some meters, such as many water and gas meters 400, are only capable of transmitting meter data with a module 404; they are not capable of receiving information or instructions from a wireless node. This is often because, unlike electricity meters that can receive power directly from the power line to which they are connected, the water and gas meters 400 do not have an available source of power and usually rely on batteries to power any communications or other circuitry. Such "one-way" nodes 404 must always depend on the bi-directional nodes 114 in the network to relay their meter data 410 to the central node.

As also mentioned above, in embodiments, each bidirectional node 114 may be within range and capable of receiving meter data 410 directly from multiple transmit-only nodes 404. Consequently, the meter data 410 transmitted by a given transmit-only node 404 may be received by multiple bi-directional nodes 114 and thus relayed through the network 112 to the central node (collector) 116 multiple times. While redundancy can help to provide successful data transmission, too much redundancy can be problematic because it results in too many bidirectional nodes 114 transmitting the same meter data 410 back to the central node 116. This places an unnecessary burden on the system 110 from an overall communications traffic point of view, and this problem is exacerbated when meters 114 are located several hop distances away from the central node 116. In some networks, the bidirectional meters 114 are only allocated a fixed time period (e.g., an "exception" time) in which to relay all of their meter data 410 to the central node. When a bidirectional meter 114 has received meter data 410 from a large number of transmit-only nodes 404, it is possible that the bidirectional meter 114 will need to relay more data 410 than it is able to transmit within the fixed time period. If the bidirectional meters 114 cannot relay all of their meter data 410 within the fixed time period, then separate individual "polled" requests may need to be issued by the central node 116 to retrieve the excess meter data 410.

Novel embodiments contemplated herein are directed to a two-way communication module 402 (transceiver) for a battery powered meter (such as a gas or water meter), communication methods for such battery-powered meters 400, and wireless networks that include such meters 400 and modules 402. The two-way communication module 402 may be of the same design as the communication circuitry 306 or 306' of the collector 116 or meter 114, respectively, described above and illustrated in FIGS. 4A-4B. But, in accordance with the embodiments, it is operated differently. Referring again to FIGS. 2 and 2A, for example, in one embodiment, the receiver portion of the two-way module 402 may only be operational for a short duration (e.g., tenths of a second) following certain transmissions by the module 402, as opposed to staying on always or for longer periods of time. This helps to conserve battery power. While in one embodiment, the transmitter power is the same as that used in the traditional bi-directional nodes (e.g., collector 116 or meter 114), in other embodiments, the signal power of the communications module 402 may be less than those of typical bi-directional nodes 114 or 116.

Thus, while the module 402 has two-way communications capability, it may still rely upon other more fully functional bi-directional nodes, such as the meters 114 described above, to pick up its data transmissions and relay those transmissions to a central collection point, such as collector 116. However, to reduce the redundancy problem that often results when too many of the traditional bi-directional nodes 114 receive and forward the data from a given battery-powered device 400, the embodiments may use the two-way communication capability of the module 402 to enable the battery-powered meters 400 to establish a registered communication relationship 502 with a relatively smaller number (e.g., 1 to 3) of traditional bi-directional nodes 114 (e.g., electricity meters). In one embodiment, bi-directional nodes 114 that are not specifically registered to communicate with a given module 402 may not forward data 410 received from the module 402 to the central connection point, thus reducing unneeded redundancy.

In greater detail, and with reference to FIGS. 2 and 2A, in an embodiment, a registered communication relationship 502 may be established between a two-way module 402 of a battery-powered meter 400 and a limited number of traditional bi-directional communication nodes (electricity meters) 114. A meter 114 in such a registered communication relationship 502 with a two-way module 402 may be referred to as a "registered meter 114r." A registered meter 114r may be a meter 114a or a meter 114b, or a meter 114 at any level of the subnet 120. When a registered communication relationship 502 has been established between an electricity meter 114r and a two-way module 402 of a battery-powered meter 400, that registered meter 114r will receive from the module 402 information about consumption of a commodity measured by the battery-powered meter and will forward that information on to the collector 116 via the electricity meter's registered path 506 to the collector. As mentioned, that same battery-powered meter 400 may also have a registered communication relationship 502 with a limited number of additional electricity meters 114r (up to two additional meters in the present embodiment). In an embodiment, it is the module 402 of the battery-powered meter, and not the collector 116 or any other node 114, that controls the establishment of the registered communication relationships 502 with the registered meters 114r. However, the registered meters 114r may communicate the existence, details, and status of their respective registered communication relationships 502 with the module 402 to the collector 116. As mentioned, the number of meters 114r that may be in a registered communication relationship 502 with a particular two-way module 402 of a battery-powered meter 400 may be limited to a predetermined number of meters 114 (e.g., up to three meters 114).

In an embodiment, in addition to (or instead of) having a registered communications relationship with a limited number (e.g., up to three) of electricity meters 114r, a two-way module 402 of a battery powered meter 400 may also establish an associated communication relationship 504 with one particular bi-directional communication node (electricity meter) 114 in order to support provision of commodity consumption information to an in-premises display device 448. For example, at a given customer location (such as the customer's home), an associated communications relationship 504 may be established between the customer's electricity meter 114 and the customer's gas meter. An associated communications relationship 504 could also be established between that electricity meter and the customer's water meter. A meter 114 in such an associated communication relationship 504 with a two-way module 402 may be referred to as an "associated meter 114s." Once an associated communications relationship 502 is established between an electricity meter 114s and the two-way communications module 402 of a given battery powered meter 400, that associated meter 114s will not only forward to the collector 116 any commodity consumption information received from the battery powered meter, but it will also store that commodity consumption information so that it can provide that commodity consumption information to an in-premises monitoring device 448 (via a communication path 508) along with its own electricity consumption information. Thus, to the in-premises monitoring device 448, the associated meter 114s becomes not only the source for its own electricity consumption information, but also the source for the commodity consumption information of any "associated" battery powered meters at that location. The in-premises monitoring device 448 may, for example, comprise an in-premises display 450. In an embodiment, a meter 114s or 114r/s that has an associated communication relationship 504 with a module(s) 402 of one or more battery-powered meters 400 may still have registered communications relationships 502 with the modules 402 of other battery-powered meters 400 for with which it is not "associated."

As mentioned, a meter 114s or 114r/s that has an associated communications relationship 504 with one or more battery-powered devices 400, will also have a communications relationship with an associated in-premises device 448, such as an in-premises display 450. This enables the meter 114s or 114r/s to provide commodity consumption information to the in-premises device. The communication relationship 508 between the meter 114s or 114r/s and the in-premises device 448 may take a variety of forms and may be implemented with a variety of communication protocols, either with commercially available protocols or proprietary protocols. For example, in an embodiment, the in-premises device 448 may include a transceiver that implements a protocol, such as Zigbee or Bluetooth, and a corresponding communication module may be added to the meter 114s or 114r/s (separate from and in addition to the communication module 306' in the meter) in order for the two devices to establish the communication relationship 508 between them. In another embodiment, the communication module 306' could be used to establish the communication relationship 508 with the in-premises device 448, in which case the in-premises device would have a receiver or transceiver capable of communicating with the module 306' of the meter. Generally, the communication relationship 508 allows the meter 114s or 114r/s to provide the in-premises device 448 with the data 410 from the module(s) 402 of any battery-powered meters (e.g., gas and/or water) that have an associated communication relationship 504 with that meter, as well as its own electricity consumption information. The data may be provided either upon the device's 448 request and/or upon predetermined conditions or time intervals. The communication relationship 508 may be typically bi-directional although in an embodiment it may be one-directional (from the meter 114s or 114r/s to the in-premises device 448).

An associated meter 114s may be a meter 114a or a meter 114b or any meter 114 in the subnet 120. In addition, the associated meter 114s may also serve the same function as one of the registered meters 114r. Thus, as discussed above, the associated communication relationship 504 may allow for the communication of the measured data 410 from the associated two-way module 402 to a collector 116 via the one associated meter 114s. Of course, the data 410 from the battery-powered device may also reach the collector 116 via one or more other meters 114r with which the battery-powered devices' communication module 402 may have established a registered communication relationship 502. And any one of those other registered meters 114r may be serving as an associated meter 114s or 114r/s for some other battery-powered device's communication module 402.

In FIG. 2A, a meter "114r/s" is a meter 114 that has at least one associated module 402 in an associated communication relationship 504 and also serves as a repeater for another module 402 in a registered communication relationship 502. A meter 114a/b in FIG. 2A may be a meter 114 that may not have either a registered communication relationship 502 with a module 402 or an associated communication relationship 504 with a module 402. A meter 114a/b may be a meter that, as described above, has a registered communication relationship 506 with another meter 114.

The associated communication relationship 504 between a meter 114s or 114r/s and one or more modules 402 of battery-powered meters may allow the meter 114s or 114r/s to manage encryption keys associated with the modules 402. Also, the associated communication relationship 504 may allow the meter 114s or 114r/s to manage over-the air (OTA) flash updates of the firmware of the modules 402.

The associated communication relationship 508 between a meter 114s or 114r/s and one or more in-premises devices 448 may allow the meter 114s or 114r/s to manage encryption keys of those devices 448 as well. Also, the associated communication relationship 508 may allow the meter 114s or 114r/s to manage over-the air (OTA) flash updates of the firmware of the devices 448. In one embodiment, the communication relationship 508 may not allow the meter 114s or meter 114r/s to store data from the in-premises devices 448/450 as the meter 114s or 114r/s may do for the modules 402.

In an embodiment, from the perspective of any two-way module 402 there may be only one associated meter 114s or 114r/s. From the perspective of an associated meter 114s or 114r/s, there may be one or more associated modules 402 (e.g., up to four associated modules 402). Although a two-way module 402 may have only one associated meter 114s or 114r/s, another meter 114s or 114r/s may store the data 410 from a module 402 with which it is not explicitly associated if the other meter 114s or 114r/s has the capacity to do so (e.g., the other meter 114s or 114r/s has less than four associated modules 402, for example). A meter 114r may also store the data 410 from the module 402 even though it is not associated with any module 402 in particular, as long as the meter 114r has the capacity to do so. Of course, a meter 114 may transmit the data 410 to other points in the wireless network without storing the data 410 in the table 416.

From the perspective of a module 402, in embodiments, the module 402 may have a registered communication relationship 502 with one meter 114 or as many as three meters 114. In another embodiment, the module 402 may have an associated communication relationship 504 with one meter 114. In other embodiments, the module 402 may have an associated communication relationship 504 with one meter 114 and a registered communication relationship 502 with one meter 114 or with two meters 114.

As indicated above, the two-way communication module 402 for battery-powered devices 400 and associated communication protocols enable the presentation of water and gas metering data 410, in addition to electricity consumption information, on the in-premises devices 448 such as a display 450. The traditional one-way communication module 404 for battery-powered devices 400 may also allow for such in-premises monitoring, but the one-way communication module 400 contributes to the over-redundancy issue discussed previously. In an embodiment, an associated electricity meter 114s or 114r/s can communicate information, such as the measured data 410 from the two-way modules 402, to in-premises devices 448, by way of example and not limitation such as inside the home or other facility, such as on a display 450.

The following provides additional detail concerning embodiments of the two-way communication module 402 for battery-powered devices 400 as well as the protocol for establishing the registered communication relationship 502 and the associated communication relationship 504 between a battery-powered device 400 with a two-way communication module 402 and a limited number of traditional bi-directional communication nodes 114. In the embodiments that follow, the two-way communication module 402 may be described as being for use with a gas meter, but it is understood that the module 402 can be used with any battery—powered device that relies on traditional bi-directional communication nodes (such as meters 114) to relay data to a collector 116, including other battery-powered devices such as water meters. Also, the two-way communication module 402 can be employed in a network that also uses traditional "one-way" devices, such as other "one-way" gas or water meters (e.g., nodes 251-256). Moreover, the embodiments may be employed in combination with other methods for reducing redundancy of transmissions from battery-powered devices, such as those described in the aforementioned co-pending U.S. patent application Ser. No. 11/610,546.

In an embodiment, when configured for a fixed network operation, a two-way module 402 may periodically transmit a message. The period for which it transmits the message and the payload in the message may both be configurable. The two-way module 402 will transmit a "2-way, Battery-Powered Device Packet", which is shown in Table 1 for reference (it is an inbound packet type, and the "B" may indicate a "byte").

As indicated previously, in an embodiment, the two-way gas and water modules 402 may be associated with an electricity meter 114s or 114r/s. This associated communication relationship 504 allows the electricity meter 114s or 114r/s to store the gas and water information 410 for use, via

TABLE 1

| Length | CtrlField1 | SrcAddr | DestAdr1 | UtilityId | BattPwr | PktRetries | RptAddr | Tbl Ovrhd | Data | DestAdr2 | DestAdr3 | CRC |
|--------|------------|---------|----------|-----------|---------|------------|---------|-----------|------|----------|----------|-----|
| 1B | 1B | 4B | 4B | 1B | 1B | 1B | 1B | 8B | 38B | 4B | 4B | 2B |

The two-way module 402 may insert up to three destination addresses in the device packet. Each address in the packet corresponds to a time slot that the identified electricity meter, such as a traditional bidirectional communication meter 114, should respond in. In other words, the electricity meter 114 that may be identified by DestAdr1 responds in the first time slot, the electricity meter 114 that may be identified by DestAdr2 responds in the second time slot, and the electricity meter 114 that may be identified by DestAdr3 responds in the third time slot. The BattPwr field may be a field that is specific to the device packet from 2-way battery powered devices 402. The parameters associated with the BattPwr field may be (where the "B" may represent a bit designation in the respective field):
- B0-3: ResponseTimeslots. The number of timeslots available for receiving devices to respond. The first timeslot is reserved for DestAddr1, the second timeslot for DestAddr2, and the third timeslot for DestAddr3. If ResponseTimeslots is greater than 3, any device receiving the message may respond and pick a random timeslot between 4 and ResponseTimeslots;
- B4-5: Meter association (0-3). Set to the destination address that is the gas/water module's associated meter. 0=no meter association, 1=DestAddr1, 2=DestAddr2, 3=DestAddr3; and
- B6-7: May be Spare The CtrlField1 field of the device packet may be set in the following manner:
- B0-1: Version, set to 1 if encryption is used in the packet, 0 otherwise;
- B2: Node type—set to 1 for battery-powered device;
- B3: Direction—set to 0 for inbound (2-way gas/water modules always transmit inbound packets);
- B4-5: Day type—unused for inbound, always set to 0; and
- B6-7: Meter type—set to 1 for gas, 2 for water Electricity meters 114 receiving the message will interpret the device packet type based on the flags in CtrlField1 (for example, a battery powered gas module). A non-zero BattPwr field may be used to differentiate 1-way gas/water module 400 messages from 2-way gas/water module 402 messages. Electricity meters 114 may store the payload if they are uniquely identified in the packet. Electricity meters 114 that are not uniquely identified in the packet may not store the payload and/or attempt to re-transmit the payload to the collector via the network. Electricity meters 114 responding that are not uniquely identified to do so may respond to allow the two-way gas/water module 402 to build a list of preferred electricity meters 114 to which it will send the message. Electricity meters 114 will also store the payload if they are an associated meter 114s or 114r/s with the two-way gas/water module 402. It is possible for an associated electricity meter 114s or 114r/s to store the payload, but not respond to the two-way gas/water module 402.

a communication relationship 508, by an in-premises device 448, such as an in-home display 450. The two-way gas and water modules 402 may get the information for the associated communication relationship 504 in one of at least two ways. In an embodiment, the information for the associated communication relationship 504 can be programmed into the two-way module 402 by a handheld installation tool (not shown). The handheld tool may get the information for the associated communication relationship 504 either from a work order, or by scanning the LAN Id of the electricity meter 114s or 114r/s on the same residence, for example.

In another embodiment, the information for the associated communication relationship 504 can be downloaded to the electricity meter 114s or 114r/s via the fixed network 112, for example, from the collector 116. When responding to messages from the two-way gas/water modules 402, the electricity meter 114s or 114r/s may indicate if the two-way module's 402 ID matches the electricity meter associated communication relationship 504 information. In this embodiment, the meter associated communication relationship 504 information may be downloaded to the electricity meter 114s or 114r/s via the fixed network 112.

Once the two-way gas/water module 402 knows of the associated communication relationship 504, it will use the unique address of the associated meter 114s or 114r/s in the DestAdr1 field in the device packet. Thus, the DestAdr1 field may be reserved for the associated meter 114s or 114r/s. If the two-way gas/water module 402 does not know the association, the DestAdr1 field will be NULL. This allows the associated meter 114s or 114r/s to respond in this slot if it knows the associated communication relationship 504 information.

In an embodiment, the two-way gas/water modules 402 may not have an associated meter 114s or 114r/s. Thus, the two-way gas/water module 402 may be installed in a location where there is not an associated electricity meter 114s or 114r/s.

In an embodiment, the two-way gas/water module 402 may transmit directly to up to three electricity meters 114r (1, 2, or 3 meters) in a registered communication relationship 502. In another embodiment, the two-way gas/water module 402 may transmit up to three (1, 2, or 3) electricity meters 114 in a combination of a registered communication relationship 502 with up to two (1 or 2) meters 114r and an associated communication relationship 504 with one (1) meter 114s or 114r/s. In another embodiment, the two-way gas/water module 402 may communicate with only one (1) meter 114s or 114r/s in an associated communication relationship 504.

The number of electricity meters 114 that the two-way gas/water module 402 may transmit to may be determined by a quality of a communication 520 such as a read success average (or rate) 522 of one or more electricity meters 114. The read success average 522 may be used once the transmit history of the respective electricity meter 114 is filled, which may be by way of example and not limitation, 8 transmits. This measure of a quality of communication 520 may take various forms such as but not limited to the read success average (or rate) 522, which may be the number of received messages out of 8 possible messages. If there is an associated meter 114s or 114r/s, that meter 114s or 114r/s may always be in the transmit list, regardless of success average (or rate) 522 or any value of a quality of communication 520. New meters 114r can be discovered by using the random timeslots after the transmitted meters 114r (already registered meters 114) timeslots. The two-way gas/water module 402 will make determinations about what meters 114r to transmit to based on configurable predetermined thresholds 530 described below.

When a two-way gas/water module 402 has no meters 114 in its install list, or fewer than the module 402 needs, the module 402 may transmit with the number of random timeslots set to the max value (for example, a default 15, but this parameter may be configurable). The module 402 may then add the meters 144 with the highest Received Signal Strength Indication (RSSI) 524 values to its list. On initial install, the module 402 may try to fill the three available slots, but on subsequent rescans, the module 402 may try to fill as many slots as it needs (explained in more detail below). The number of available timeslots for targeted meters 114r is configurable, and may be set to 1, 2, or 3 devices.

After every transmission, the two-way water/gas module 402 may calculate the success average (or rate) 522 for all the meters 114 in the list. The module 402 may then sort the list, and may make a determination of the number of meters 114 that the module 402 needs to transmit to based on the success criteria 522. If the number of meters 114 it needs to transmit to is less than the current number of meters 114 in its list, the module 402 may start the discovery phase listed above, but may only add up to the number of meters 114 it needs. As stated above, if the module 402 is aware of an associated meter 114s or 114r/s, then that meter 114s or 114r/s is a meter 114 that the module 402 needs to transmit to. If the module 402 has more meters 114 in its list than the module 402 needs, then the module 402 may just drop meters 114 off the end of the list. An illustrative decision process is shown in Table 2.

TABLE 2

| Meter Status | Number of Meters 114 Required |
| --- | --- |
| 1) The module 402 has an associated meter 114s or 114r/s, and the meter's 114s or 114r/s transmit history is full, and the meter's 114s or 114r/s success rate exceeds the associated meter threshold 530a | 1 - associated meter 114s or 114r/s only |
| 2) The module 402 has no associated meter 114s or 114r/s, and the first meter 114r (highest success rate 522) has its transmit history full, and its success rate 522 exceeds the single meter threshold 530b | 1 - highest success rate 522 meter 114r only |
| 3) Neither condition one or two are met, and the first two meters 114r have their transmit history full, and the average success rate 522 of the two meters 114r exceeds the two meter threshold 530c | 2 - first 2 meters 114r in the list (if there is an associated meter 114s or 114r/s, it is in slot 1 regardless of the success rate) |
| 4) None of the above conditions 1, 2, or 3 are met - threshold 530d | 3 |

In an embodiment, if the number of meters 114 is set to 3, and the average success rate 522 is less than the 3-meter threshold, then the last registered meter 114r on the list may be marked for replacement. If the last registered meter 114r on this list has a success rate of 0 (provided the history is full), that meter 114r may always be marked for replacement. When a meter 114r is marked for replacement, the module 402 will go into a scan mode during the next transmit cycle. If any meters 114 respond during the random slots, then the meter 114r with the highest RSSI 524 may replace the last meter 114r.

In an embodiment, the two-way gas (or water) module 402 may have the 4 configurable predetermined thresholds as described above and shown in Table 2. Each of the predetermined thresholds 530 (530a, 530b, 530c, and 530d) may be the number of messages received out of a possible 8 messages. As shown in Table 3, the predetermined thresholds 530, although configurable, may also have default values. The examples in Table 3 are examples and not limitations.

TABLE 3

| Threshold | Usage | Threshold Default Value |
| --- | --- | --- |
| Associated Meter Threshold 530a | Threshold associated meter 114s or 114r/s must exceed to be the only meter 114 transmitted to. For example, if the threshold is set to 5, the gas module 402 must have received 6 of the last 8 responses from the electricity meter 114 or the gas module 402 will use a second device 114 for redundant data transfer. | 5 |
| Single Meter Threshold 530b | Threshold the top meter 114r must exceed to be the only meter 114 transmitted to if there is not an associated meter 114s or 114r/s. | 6 |
| 2-Meter threshold 530c | Threshold the average of the top 2 meters must exceed to be the only 2 | 4 |

TABLE 3-continued

| Threshold | Usage | Threshold Default Value |
|---|---|---|
| | transmitted to. The two meters could be both 114r meters or one 114r meter and one 114s or 114r/s meter. | |
| 3-Meter Threshold 530d | Threshold the average of the 3 meters must exceed before the scan starts to replace the bottom meter (if one meter 114 is a 114s or 114r/s meter - it may not be replaced, 114r meters may be replaced) | 2 |

In an embodiment, Table 4 shows the messages that may be transmitted by the two-way water/gas modules 402. Only particular fields in the packet header are shown. The packet header may define the functions of one or more of the fields listed in the device packet shown in Table 1. The two-way gas/water modules 402 transmit inbound packets (i.e., packets intended to be communicated from the modules 402 to the collector 116). The electricity meter 114*r*, 114*s*, or 114*r/s* may store everything after the Tbl Length field (generally referred to as the data 410 of the module 402). The data 410 may be stored by the electricity meters 114*r*, 114*s*, or 114*r/s* and is then forwarded to the system collector 116 via the respective meter's communication path 506 to the collector. As mentioned above, each meter 114 has either a direct path to the collector 116 or an indirect path through one or more intermediate meters that serve as repeaters. The data 410 may be removed from the electricity meter 114*r* when it is acknowledged by the collector 116. For associated electricity meters 114*s* or 114*r/s*, the electricity meter 114*s* or 114*r/s* may store the same data 410 in a separate table 416, allowing in-premises devices 448 to have the most recent data 410 from the two-way water/gas module 402.

As mentioned above, in-premises devices 448 typically are unable to retrieve the gas/water module 402 data 410 from gas/water modules 402 directly. One reason is that the gas/water modules 402 are normally in a low power sleep mode and cannot receive and respond to messages. Also, many in-premises devices 448 are themselves battery-powered, and the limitations that imposes on communications (such as the inability to constantly listen for data) also makes it impractical for such in-premises devices 448 to receive data 410 directly from battery-powered meters 400. Thus, the ability to store data 410 in an "always on" device such as the electricity meter 114*s* or 114*r/s*, enables an in-premise device 448 to retrieve the data 410 from the electricity meter 114*s* or 114*r/s* when the device 448 "wakes up" to refresh the data.

Even constantly-powered in-premises devices 448 may need to access the gas/water module data 410 from an associated electricity meter 114*s* or 114*r/s*. The constantly-powered in-premises devices 448 may still operate in a low-power mode for periods of time or they may utilize a simplified transceiver that may not be able to interpret the transmission of data 410 directly from the gas/water modules 402. Also, the constantly-powered in-premises devices 448 may simply lack the ability to request data 410 directly from a gas/water module 402 and/or they may operate under a communications protocol that is not compatible with the gas/water module 402. Thus, constantly-powered in-premises devices 448 may also need to rely on an associated electricity meter 114*s* or 114*r/s* to obtain such data 410.

As also mentioned above, in-premises devices 448 may be configured to communicate in accordance with a protocol that is not compatible with the protocol used by the meters 114 and modules 402. For example, the in-premises device may have a receiver or transceiver that implements the ZigBee protocol. In such a case, the associated meters 114*s* or 114*r/s* may need to be provided with an additional communication module (not shown) that includes a transceiver capable of communicating in accordance with the Zigbee protocol.

In the case of a battery-powered or a constantly-powered in-premises device 448 (and of any manufacture or any type) the electricity meter 114*s* or 114*r/s* may initiate a write of the data 410 to the device 448 at predetermined times-of-day or at predetermined time intervals. The electricity meter 114*s* or 114*r/s* may also initiate a write of the data 410 to the in-premises device 448 under predetermined conditions, such as but not limited to the meter 114*s* or 114*r/s* receiving an update of data 410 from the gas/water module 402.

TABLE 4

| Field | 2-Way Gas | Notes |
|---|---|---|
| CtrlField1 | Version = 0 NodeType = 1 (battery powered device) DayType = 0 MeterType = 1 (Gas) | |
| DestAddr/DestAdr1 | Associated Elec. Meter 114s or 114r/s if applicable. Otherwise unique address or 0. | Meters 114s or 114r/s will store the message if the message is from an associated module. This may occur if the electricity meter 114s or 114r/s knows it is associated, but it has not yet communicated this information to the gas/water module 402. |
| CtrlField2/BattPwr | ResponseTimeslots MeterAssociation | This field is used by electricity meters 114 to differentiate 1-way gas/water module 404 messages from 2-way water/gas module 402 messages. |
| Tbl Id | MT-220 | |
| Tbl Offset | 0 | |
| Tbl Length | 38 | |
| Water/gas address | B31: Associated Meter B0-30: LAN Id | Water/gas module's 402 LAN Id. Inserted in the packet by the water/gas module 402. When this data is stored by the associated meter 114s or 114r/s (as designated in the BattPwr field), the electricity meter 114s or 114r/s will set this bit to 1. |
| DataFormatCode | B5-7: Device Type (1 = Gas) B0-4: Message Type 1 = FN data packet | Used by the collector 116 to define the following: The number of bytes to be stored as register (consumption) data The starting address and number of bytes to be stored as daily consumption values The starting address |

TABLE 4-continued

| Field | 2-Way Gas | Notes |
|---|---|---|
| SequenceNumber | 0-255 | and number of bytes of interval data Incremented each transmission and used by the collector 116 to piece together interval data. Also used by the electric meter 114 to decide if the message is a duplicate message. Meter 114s or 114r/s only stores if DataFormatCode and SequenceNumber don't match what is already in the meter 114s or 114r/s. For 2-way modules 402, the collector 116 also uses date/timestamp information to properly reassemble interval data. |
| OneWayNodeExcFlags/ Date1 1-byte field | Date1 | Date1 (B0-7) and Date2 (B8-15) combine to form a 2-byte date field: B0-8: Day of Year B9-15: Year |
| Timestamp | B7: 1 (SetByModule) B0-6: Timestamp | |
| ExcDataLength/ Date2 1-byte field | Date2 | |
| Payload | 29 byte payload | |
| Total Stored | 38 | |

In Table 5, there is an illustrative embodiment shown of the Packet's Payload field, for a 2-Way Gas Module 402, Data Format Code 0.

TABLE 5

| Field | 2-Way Gas, Data Format 0 | Notes |
|---|---|---|
| Current Consumption | 4 bytes | |
| Status | 1 byte | |
| Time of Daily Snapshot | 1 byte | Time of day when the snapshot is taken with 15 minute resolution. Collector 116 uses this timestamp and the date transmitted by the gas/water module 402, 404 to assign the proper date to the snapshot data. |
| Daily Snapshot #1 | 4 bytes | The most recent consumption snapshot. Snapshot is taken at the same time each day. The time of the snapshot is configurable. |
| Interval Data Records | 19 records, 1 byte per record. Time synchronized. Intervals are always complete intervals. First record is most recent complete interval before the date/timestamp. | 255 = No Data 254 = n/a (reserved for water module read error) 253 = Time change marker - used to indicate a timestamp. 2 marker intervals will surround a 2-byte date/time stamp. 0-252 = consumption |

In an embodiment, after sending a message, the two-way gas/water module 402 may wait for a response from a meter 114. The meters 114 will respond either in their identified timeslot or in an allowed random timeslot. The two-way gas/water module 402 may only act on the application layer request (payload) of the first message received. After delaying to allow all messages from electricity meters 114, the module 402 may respond to the received message. The first response timeslot may be reserved for the associated electricity meter 114s or 114r/s and the associated meter 114s or 114r/s is expected to be used for on-request messaging between the system 110 and 200 and the module 402.

In an embodiment, when uniquely identified in the two-way gas/water module 402 message, the associated electricity meter 114s or 114r/s may store the payload and the relevant header information (data 410) in at table (MT-220). If MT-220 is full, the meter 114s or 114r/s may not respond to the gas/water module 402. This may ensure modules 402 do not rely on overloaded electricity meters 114 for forwarding their data 410.

In either the identified timeslot or in a random timeslot, the electricity meter 114s or 114r/s may respond with an outbound packet with the water/gas payload. This outbound packet allows the date and time information to be sent to the gas/water module 402. If sending a randomized response, the meter 114 will pick a random timeslot between the first unused timeslot and the maximum number of timeslots. For example, if the gas module 402 lists 15 timeslots, DestAdr1 is non-zero, and DestAdr2 is zero, the electricity meter 114s or 114r/s picks a random timeslot between 2 and 15. The first slot may begin 125 msec after the packet is received. The slots are 100 msec apart thereafter. As illustrated in Table 6, the electricity meter 114r/s may have additional tables for the messages to and responses from gas and water modules 402.

TABLE 6

| Table Id | Table Name | Description |
|---|---|---|
| MT-300 | Associated Modules | An array of four LAN Ids identifying the gas/water modules 402 that are associated to the electricity meter. |

TABLE 6-continued

| Table Id | Table Name | Description |
|---|---|---|
| MT-301 | Specific Module Messages | MT-301 contains four entries, where each entry consists of the following fields: LAN Id TransferPending flag |

TABLE 6-continued

| Table Id | Table Name | Description |
|---|---|---|
| MT-302 | Specific Module Responses | C12 message (payload) This table allows the system (MAS/collector 116) to send a message to a gas/water module 402. The targeted module 402 does not need to be an associated device. MT-302 contains four entries, where each entry is a LAN Id and a response message from the gas/water module 402. The message is the response from the MT-301 request sent to the module 402. |
| MT-303 | Generic Module Messages | MT-303 contains four entries, where each entry consists of a data format code and a message to be sent to modules reporting data with a matching data format code. If the REX2 meter receives a message from a module with a LAN Id not listed in MT-301, the meter 114 responds with the generic message matching the received format code. The meter 114 will send the message to the unique address of the module 402 and the module 402 will respond to acknowledge the message. The electric meter 114 will discard the response because it cannot store multiple responses to this generic message. NOTE - the gas module does not accept broadcast (DestAddr = NULL) packets. |
| MT-304 | Associated Module Data - Table 416 | For the associated modules 402 listed in MT-300, storage space for the most recent transmission from the module 402. These entries are not removed when read by a device so the data are always available to users (e.g. in home displays 448) |

When MT-301 is written, the meter 114s or 114r/s will zero the corresponding MT-302 entry if the MT-301 TransferPending flag is set. When a response is received from the targeted LAN Id, the meter 114 may 1) write the LAN Id and response data to the appropriate entry in MT-302; and 2) zero the corresponding MT-301 TransferPending flag. This allows the system collector 116 to detect the change and read the response from the gas/water module 402.

By way of example and not limitation, a typical sequence of events for an on-request read of gas/water module 402 data 410 is as follows:

1) MAS (Metering Automation Server 202 or 206; i.e. system software used by utility personnel) writes a request to a collector 116 and identifies a specific gas/water module 402 for the read. Alternatively, the MAS 202 or 206 may specify the electricity meter 114 to use to pass the message and the gas/water module 402 address from which data 410 is requested 2) The collector 116 uses association information or the direct information provided by the MAS 202 or 206 and writes the gas/water module 402 request to the electricity meter tables MT-301. The meter 114s or 114r/s sets a status flag in the register data table to indicate that a transfer to an external device is pending.

3) When the electricity meter 114s or 114r/s hears a message from the uniquely identified device, it will respond with the message posted in MT-301.

4) The gas/water module 402 receives and processes the request and transmits a response message back to the electricity meter 114s or 114r/s. The electricity meter 114 stores the response in MT-302 and clears the "transfer to an external device pending" flag.

5) The collector 116 periodically reads the register (billing) data table from the electricity meter 114r/s. Included in this table is the "transfer to an external device pending" flag.

When the collector 116 has posted a request, it will detect a change in state of the flag as an indication that MT-302 data from the device is available.

6) The collector 116 reads the response data from MT-302.

7) A separate pending transfer flag exists in the collector 116 and is used by the MAS 202 or 206 to determine when the collector 116 has received the requested data.

In an embodiment, the MT-303 message is a generic message sent to modules of a specific format code, where the format code indicates the type of device. When a specific message is not in the queue for a unique gas/water module 402 LAN Id, the electricity meter 114 responds with the MT-303 message that matches the format code of the received gas/water module 402 message. These generic messages may be used to send updates of information common to all devices of a given type. For example, it may be used to send calendar or time of use (TOU) switchpoint information.

Tables 7, 8, and 9 illustrate other messaging between the electricity meter 114s or 114r/s and the gas/water module 402. The messaging in Tables 7, 8, and 9 do not include the previously described message transfer details between the collector 116 and the electricity meter 114s or 114r/s.

In Table 7, a standard response for a non-acknowledged write command is illustrated. This sequence shows a response with no payload (there is no MT-301 entry for the gas module 402 LAN Id and the MT-303 message for the received water/module 402 format code is null).

TABLE 7

| Gas/Water Module | Msg | Electricity Meters |
|---|---|---|
| MT-220 Write | → | |
| | TS1 | Meter matching DestAdr1 |
| | ← | |
| | TS2 | Meter matching DestAdr2 or $1^{st}$ random timeslot |
| | ← | |
| | TS3 | Meter matching DestAdr3 or $2^{nd}$ random timeslot |
| | ← | |
| | TS4 | For random responses |
| | TS5 | |
| | . | |
| | . | |
| | . | |
| | TS15 | |
| Gas/water module returns to sleep mode | | |

In Table 8, a read command is illustrated. This sequence shows a sequence with a meter 114 where an additional table is read from the gas module 402.

TABLE 8

| Gas/Water Module | Msg | Electricity Meter |
|---|---|---|
| MT-220 Write | → | |
| | TS1 | Meter matching DestAdr1 |
| | ← | |
| | TS2 | Meter matching DestAdr2 or $1^{st}$ random timeslot |
| | ← | |
| | TS3 | Meter matching DestAdr3 or $2^{nd}$ random timeslot |
| | ← | |
| | TS4 | |
| | TS5 | For random responses |
| | . | |
| | . | |
| | . | |
| | TS15 | |

TABLE 8-continued

| Gas/Water Module | Msg | Electricity Meter |
|---|---|---|
| Read Response. Gas/water module only responds to the first message received. | → | If in response to a MT-301 message, the module response data is stored in MT-302. |

In Table 9, an acknowledged write command is illustrated. This sequence shows a sequence with a meter 114s or 114r/s where a gas/water module 402 table is written and an acknowledgement is desired by the system.

TABLE 9

| Gas/Water Module | Msg | Electricity Meter |
|---|---|---|
| MT-220 Write | → | |
| | TS1 | Meter matching DestAdr1 |
| | ← | |
| | TS2 | Meter matching DestAdr2 or 1$^{st}$ random timeslot |
| | ← | |
| | TS3 | Meter matching DestAdr3 or 2$^{nd}$ random timeslot |
| | ← | |
| | TS4 | For random responses |
| | TS5 | |
| | . | |
| | . | |
| | . | |
| | TS15 | |
| Read Response. Gas/water module only responds to the first message received. | → | If in response to a MT-301 message, the AOK from the module is stored in MT-302. If in response to a MT-303 message, the electricity meter does not store the response. |

In an embodiment, electricity meters 114s (or 114r/s) may have up to 4 slots for associated two-way gas/water meter modules 402. The meter 114s or 114r/s may store a full copy of the MT220 write (38-byte payload) (data 410) in one of the four slots in a Table 416 (one slot for each of the up to 4 associated modules 402) of the meter 114s or 114r/s. If there is no module 402 programmed into a slot, it will have an ID of 0 (unused). Associated communication relationships 504 may be set in at least two ways. In an embodiment, the collector 116 may execute a procedure on an electricity meter 114s or 114r/s, adding an associated two-way gas/water module 402 to the meter 114s's or 114r/s's list. This procedure may also be used to delete associated communication relationships 504. The procedure response may always include a list of the associated two-way modules 402.

In another embodiment, the gas/water modules 402 may indicate which meter 114s or 114r/s is the associated meter 114s or 114r/s in the BattPwr field in the module 402's device packet header. If an electricity meter 114s or 114r/s hears a message where it is designated the associated meter 114s or 114r/s, but it does not have the module 402 in the list, the meter 114s or 114r/s will automatically add the module 402. If the meter 114s or 114r/s no longer has room for any associated modules 402, the meter 114s or 114r/s will set an overflow flag. The payload data 410 for all modules 402 can be read through a direct table 416 read.

The response packet transmitted by electricity meters 114s (or 114r/s) will be a standard outbound packet with the time and day type in the response packet header. The date and the payload from MT-301 or MT-303 is contained in the "application" layer of the packet. An example response packet, with relevant packet header information is shown in Table 10. Fields indicated with an asterisk (*) are in the application layer.

TABLE 10

| Field | Electric Meter/Node Response | Notes |
|---|---|---|
| CtrlField1 | Version = 0 - no encryption, 1 - encryption enabled NodeType = 0 DayType = weekday, weekend, spec1, or spec2. MeterType = 0 (electric) | Day type is only valid if TimeIsRelative = False. The version bit will be set the same as the requesting message, i.e., if encryption is selected in the request, it will be used in the response as well. |
| DestAddr | Module's address | |
| CtrlField2 | B7: TimeIsRelative B1-6: Set to 0 B0: MeterAssociation | MeterAssociation is set to TRUE if the electric meter 114s or 114r/s is associated with the gas/water module 402 |
| PktRetries | 0 | |
| Time | Time per EA format | Only valid if TimeIsRelative = FALSE |
| RptPath | All fields 0 | |
| Date* | Date | 2 bytes per the electric meter definition: B9-15: Year (Mod 100) B0-8: Day of Year If the date is invalid, the meter 114s or 114r/s will set this field to 0xFFFF and the date should not be used by the gas module 402. |
| C12 Command* | Read Offset Write Offset | From MT-301 or MT-303 |
| Tbl Id* | 2-byte Table Id | From MT-301 or MT-303 |
| Tbl Offset* | 3-byte Table Offset | From MT-301 or MT-303 |
| Tbl Length* | 2-byte Table Length | From MT-301 or MT-303 |
| Tbl Data* | Data if write command | From MT-301 or MT-303 |

In an embodiment, collectors 116 may receive gas and water consumption data 410 either directly or through an electricity meter 114 using the exception handling mechanism. Collectors 116 may recognize the two-way gas/water module 402 data 410 using the format code associated with the data 410. A format code of zero or a format code that is not recognized by collector 116 firmware may be stored in an MT_169_ONE_WAY_DATA_TABLE in raw form for interpretation by upstream software if space is allocated to store new node data (MT_174_EXTENDED_LANOB_CONFIGURATION.MAX_NUM_NEW_ONE_WAY_NODES).

The gas/water meter module 402 format codes may be used to define where consumption, snapshot, and interval data are contained in the one-way packet and how the collector 116 is to store them. The one-way packet is transmitted on a regular basis and the format code maps a specific data definition for any device or software interpreting the data. A control table implemented in the collector 116 may be used to describe how to handle each format code. Each control entry may identify the format code, the offset and the length for consumption information, the offset and length for interval data and the offset and length for snapshot data. A particular format code may have any combination of data associated with it. There may be an entry in the control table for each supported format code. The collector 116 may be organized around the control table so that a gas or water meter module 402 can support multiple format codes depending on the type and amount of data being sent back.

In an embodiment, for each stored consumption data, snapshot, or interval data, the format code of the data 410 may be stored with the data 410 to facilitate interpretation of the data. The collector 116 may provide a filtered data table request that may return the consumption or snapshot data by format code or address match. The collector 116 may have a limit on the size of the data that is stored in the consumption table and the snapshot table. The data size for consumption and snapshot data may not be altered without a change to the collector 116 firmware. The current embodiment stores consumption data in a 32 bit unsigned integer and 8 bits of status information.

In an embodiment, for each gas/water module 402, the collector may have 2 slots for the source electricity meters 114, as well as time and date (3 bytes packed, for example) for each slot. The upper bit of the electricity meter 114 address may indicate whether or not the meter 114 is the associated meter 114s or 114r/s. The associated meter 114s or 114r/s may not be bumped from the list, even if two other meters 114r are communicating reliably. A meter 114r may be bumped from the list if it is out of date by a configurable amount of time (default 16 hours), and another meter has fresh data (and it is not the associated meter 114s or 114r/s). These meter 114 IDs will be used by the collector 116 when specific info needs to written to, or read from the gas or water module 402 on an individual basis. Additionally, the collector 116 may tell the associated meter 114s or 114r/s what the meter's 114s or 114r/s gas/water meter modules 402 are so that the meter 114s or 114r/s can store consumption data 410 for those modules 402.

In some cases, a communication failure may occur between an associated meter 114s or 114r/s and one or more of its associated battery-powered devices. This would prevent the associated meter 114s or 114r/s from receiving commodity consumption information 410 from the modules 402 of those associated battery-powered meters 400. To enable the associated electricity meters 114s or 114r/s to still obtain that information 410, in an embodiment, the collector 116 may have configuration information indicating whether or not the collector 116 will need to update gas and water data 410 from the two-way gas/water modules 402 in the associated electricity meters 114s or 114r/s, and what a predetermined maximum staleness time limit 550 may be. If the collector 116 has been configured to perform such an update (also referred to as "pushing down" to the associated meter 114s or 114r/s), the collector 116 may monitor the staleness of the data 410 coming from the associated meter 114s or 114r/s. Whenever the staleness exceeds the limit 550, the collector 116 will write the data 410 to the meter 114s or 114r/s. The procedure used to set the associated meter 114s or 114r/s may also be used to write the consumption data 410 to the associated meter 114s or 114r/s. Thus, in this case, the associated electricity meter 114s or 114r/s obtains the data 410 of its associated battery-powered devices 400 from the collector.

In an alternative embodiment, the associated meter 114s or 114r/s could receive the data from a second meter 114 (instead of from the collector). For example, a second meter 114 could also store data 410 for the module(2) 402 associated with the first meter 114s or 114r/s that is now having communications difficulty. Although not the "associated meter" for that module(s) 402 (indeed, the second meter 114 may be an associated meter for another module 402), it may have one or more open slots available. The second meter 114 may store the data 410 for the module 402 in one of those open slots, just as the module's 402 associated meter 114s or 114r/s would do. That second meter could then supply the data 410 to the electricity meter 114s or 114r/s that is having trouble communicating with its associated module(2).

With the foregoing details in mind, and with reference to FIGS. 2, 2A, 3, 4A, 4B, and 5-7A, the following method may be performed by an electricity meter 114s or 114r/s to receive and store information 410 about the measured consumption of a commodity measured by a battery-powered meter 400 with which it has an associated communication relationship 504; transmit both the received information about the consumption of the other commodity 410 and information about the consumption of electricity measured by the electricity meter 114s or 114r/s to the collector 116; and transmit this same information to a remotely located display 450 (such as an in-premises display) associated with the electricity meter 114. As mentioned above, each of the electricity meters 114, including meters 114s or 114r/s, may have a wireless communication path to the collector 116 that is either a direct communication path to the collector 116 or an indirect communication path through one or more other electricity meters 114 that serve as repeaters.

In one embodiment, the association between the one electricity meter 114r/s or 114s and the at least one battery-powered meter 400 with module 402 is determined by association information provided to the electricity meter 114s or 114r/s from the collector 116. In an alternative embodiment, the association between the electricity meter 114r/s or 114s and the battery-powered meter 440 with the module 402 is determined by association information provided to the electricity meter 114s or 114r/s from the battery-powered meter 400 via the module 402. In either embodiment, the association information identifies the battery-powered meter's 400 module 402 as a meter/module with which the electricity meter 114s or 114r/s is to establish an associated communication relationship 504.

Referring to the FIGS. 2, 2A, 3, 4A, 4B and 5, according to the method, (in step 610) the electricity meter 114s or 114r/s receives information about measured consumption 410 of the other commodity from the associated battery-powered meter 400 via the module 402 and stores the received information in a slot in table 416. The electricity meter 114s or 114r/s may then (in step 612) transmit both information about consumption of electricity measured by the electricity meter 114s or 114r/s and the information about consumption of the other commodity 410 received from the associated battery-powered meter 400 via the module 402 to the collector 116 via the wireless network 112. In addition, the electricity meter 114s or 114r/s (in step 614) may also transmit both the information about consumption of electricity measured by the electricity meter 114s or 114r/s and the information about consumption of the other commodity 410 received from the associated battery-powered meter 400 to a remotely located display 450 that is in an associated communication relationship 508 with the electricity meter 114s or 114r/s.

In an embodiment, the remotely located display 450 is a battery-powered device, or low-level powered device. In an alternative embodiment, the remotely located display 450 is a constant-powered device.

In an embodiment, the associated battery-powered meter 400 may also transmit, via its module 402, its information about measured consumption of the other commodity 410 to the collector 116 via a registered communication relationship 502 path with one or more other electricity meters 114 (i.e., ones for which it does not have an associated communication relationship 504). According to another aspect of the novel methods contemplated herein, (in step 618) when the electricity meter 114s or 114r/s for some reason is unable to receive the information about consumption of the other commodity 410 from the battery-powered meter 400 with which it has an associated communication relationship 504, the electricity meter 114s or 114r/s can be provided with that information via a different source. For example, if the electricity meter 114*s* or 114*r/s* fails to receive information about measured consumption of the other commodity 410 from the associated battery-powered meter 400 via module 402 within a predetermined amount of time 550, it may instead receive that information from the collector 116 of the wireless network 112 (assuming, of course, that the battery-powered meter 400 has also forwarded its consumption information to the collector 116 via a different electricity meter 114 with which it has a registered (but not associated) communication relationship. That is, the collector 116 will transmit the information to the electricity meter 114*s* or 114*r/s*, so that the electricity meter 114*s* or 114*r/s* still obtains that information and is able to provide the information to an in-premises display 450, despite the failure of its associated communication relationship 504 with the battery-powered meter 400 at that location. The provision of information 410 to the electricity meter 114*s* or 114*r/s* from the collector may be done at the request of the electricity meter 114*s* or 114*r/s*, or the data may be "pushed down" to the meter by the collector on its own initiative, such as when it senses that the data 410 in the meter has become stale (as described above).

In another embodiment, rather than receiving the information from the collector 116, the electricity meter 114*s* or 114*r/s* may instead receive that information directly from another electricity meter, such as but not limited to one of the electricity meters which has a registered communication relationship with the battery-powered meter. That is, because one of those other electricity meters will also receive the consumption information 410 from the battery-powered device, they could provide that information directly to the electricity meter 114*s* or 114*r/s*, again overcoming the lost communications between the electricity meter 114*s* or 114*r/s* and the associated battery-powered meter. Of course, this assumes that the electricity meter 114*s* or 114*r/s* is able to communicate with one of those other registered meters.

Figure 6:
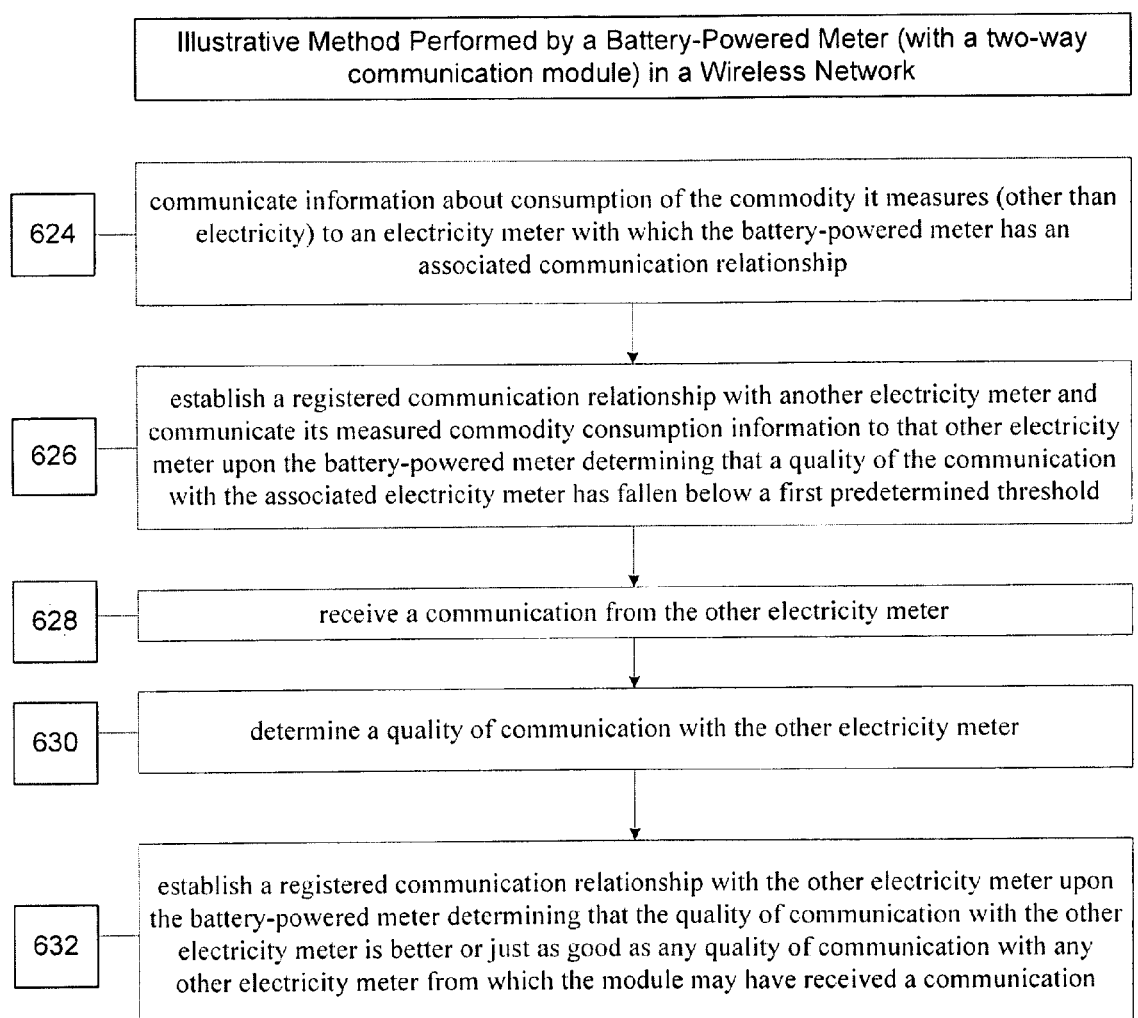
FIG. 6 is a flowchart illustrating another exemplary process embodiment.

Referring to FIG. 6 and considering the foregoing method from the perspective of the battery-powered meter 400, (in step 624) the battery-powered meter 400 may communicate information about consumption of the commodity 410 it measures via module 402 to the electricity meter 114*s* or 114*r/s* with which it has the associated communication relationship 504. In an embodiment, the associated electricity meter 114*r/s* or 114*s* may then supply the consumption information 410 measured by the battery-powered meter 400 to a remote display 450 that is in an associated communication relationship 508 with the 114*s* or 114*r/s* electricity meter, such as an in-premises display 450 at the same location. According to another aspect of the method, the module 402 of the battery-powered meter 400 (in step 626) may, upon determining that a quality of the communication 520 with the associated electricity meter 114*s* or 114*r/s* has fallen below a first predetermined threshold 530, establish a registered communication relationship 502 with another electricity meter 114 and communicate its measured commodity consumption information 410 to that other electricity meter 114. In other words, the module 402 of the battery-powered meter 400 may determine that communication to the associated meter 114*s* or 114*r/s* is insufficient (as may be indicated by the quality of communication falling below the first predetermined threshold) and seek out a registered communication relationship 502 with another meter 114.

In an embodiment, the quality of communication 520 may be a received message success average (or rate) 522 or a received signal strength indication (e.g., RSSI 524), or the like.

The battery-powered meter 400, via its two-way module 402, may establish the registered communication relationship 502 with the other electricity meter 114 by (in step 628) receiving a communication (such as but not limited to a node scan request, or the like as discussed above) from the other electricity meter 114 and (in step 630) determining a quality of communication 520 (such as an RSSI 524 or read success rate 522) with the other electricity meter 114. If the quality of communication with the other electricity meter 114 is better or just as good as any quality of communication 520 with any other meter 114 from which the module 402 may have received a communication, then (in step 632) the meter 400 will establish a registered communication relationship 502 with the other electricity meter 114.

Referring to FIG. 7 and again from the perspective of the battery-powered meter 400, the battery-powered meter 400 may perform a method to establish communication with up to two electricity meters 114. The established communication may be of the registered communication relationship 502 type, or a combination of a registered communication relationship 502 type with an associated communication relationship 504 type. The method could be conducted upon the start-up of the battery-powered meter 400, a replacement of the meter's 400 module 402, or at any time communications conditions change in the network 112, among other instances.

According to the method, (in step 640) a battery-powered meter 400 via its module 402 may receive a communication (such as a node scan request, or the like as discussed above) from a first electricity meter 114 and a second electricity meter 114. The first meter 114 and the second meter 114 may be two meters 114 of a number of electricity meters 114 in the network 112. The battery-powered meter may (in step 642) determine a quality of communication 520 with the first meter 114 and also (in step 644) determine a quality of communication 520 with the second meter 114. The quality of communication may be an RSSI 524 or a read success rate 522, or the like. The module 402 of the battery-powered meter 400 may (in step 646) determine a first value, such as but not limited to a mathematical average or median, or the like, based on the quality of communication 520 with the first meter 114 and the quality of communication 520 with the second meter 114.

The module 402 of the meter 400 may (in step 648) compare the first value with a first predetermined threshold 530 (530*a*, 530*b*, 530*c*, or 530*d*) and a second predetermined threshold 530 (530*a*, 530*b*, 530*c*, and 530*d*). The module 402 of the meter 400 may (in step 650) establish an exclusive bi-directional registered communication relationship 502 with each of the first meter 114 and the second meter 114 upon the module 402 determining that the first value meets or exceeds the first predetermined threshold 530 (530*a*, 530*b*, 530*c*, or 530*d*) and the first value falls below the second predetermined threshold 530 (530*a*, 530*b*, 530*c*, or 530*d*). In other words, if communication with only one meter 114 would be insufficient (as may be indicated by the first value falling below the second predetermined threshold) and communication with the first meter 114 and second meter 114 would be sufficient (as may be indicated by the first value meeting or exceeding the first predetermined threshold), then the module 402 will seek to establish registered communication relationships 502 with both the first meter 114 and the second meter 114. The meter 114 may establish registered communication relationships 502 with no more than the first meter 114 and the second meter 114. As mentioned above, one of the two communication relationships may be an associated communication relationship 504 with either the first meter 114 or the second meter 114 as an associated meter 114. The information directing the formation of the associated relationship 504 was discussed previously.

Figure 7:
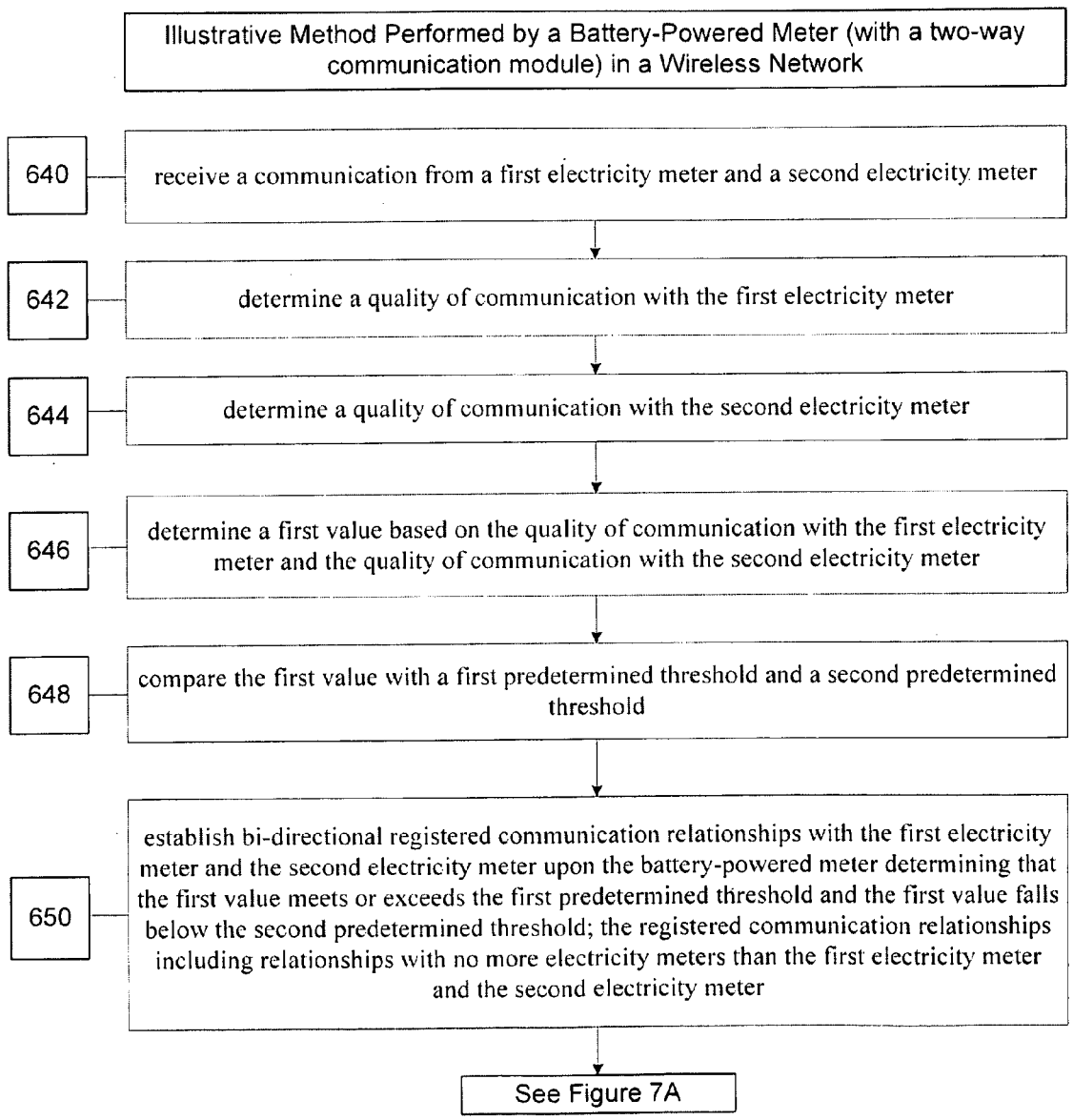
FIG. 7 is a flowchart illustrating another exemplary process embodiment.
Figure 7A:
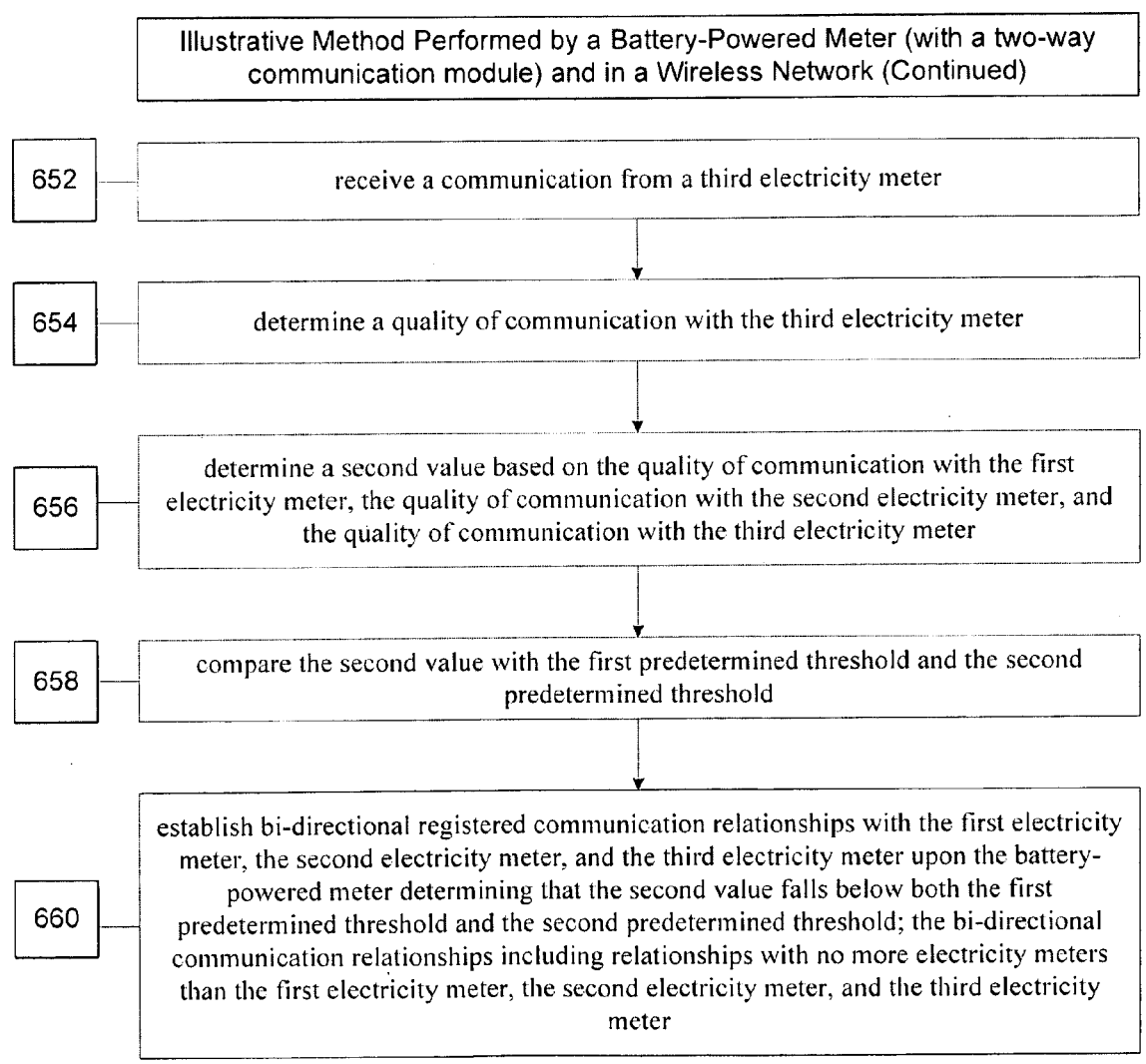
FIG. 7A is a flowchart illustrating a continuation of the process embodiment of FIG. 7.

In another aspect of the method, referring to FIG. 7A, the module 402 of the meter 400 may (in step 652) receive a communication from a third electricity meter 114 and (in step 654) determine a quality of communication 520 with the third meter 114. The module 402 of meter 400 may (in step 656) determine a second value based on the quality of communication 520 with the first meter 114, the quality of communication 520 with the second meter 114, and the quality of communication 520 with the third meter 114 (for example, the second value could be an average of the three). The module 402 of the meter 400 may (in step 658) compare the second value with the first predetermined threshold 530 (530a, 530b, 530c, or 530d) and the second predetermined threshold 530 (530a, 530b, 530c, or 530d). The meter 400 via the module 402 may (in 660) establish an exclusive bi-directional registered communication relationship 502 with the first meter 114, the second meter 114, and the third meter 114 upon the second value falling below both the first predetermined threshold 530 (530a, 530b, 530c, or 530d) and the second predetermined threshold 530 (530a, 530b, 530c, or 530d).

In other words, if communication with only the first meter 114 and the second meter 114 would be insufficient (as may be indicated by the second value falling below both the first predetermined threshold and the second predetermined threshold) then the module 402 of the meter 114 may seek communication with the first meter 114, the second meter 114, and the third meter 114. The exclusive bi-directional communication relationships 502 may include no more of the relationships with the first meter 114, the second meter 114, and the third meter 114. Again, as discussed above, one of the communication relationships with either the first meter 114 or the second meter 114 may be an associated communication relationship 504.

A novel embodiment of a wireless network 112 including a battery-powered meter 400 with a module 402 is also contemplated. The wireless network 112 may also include a collector 116 and one or more electricity meters 114. As discussed above, the electricity meters 114 may measure consumption of electricity and bi-directionally communicate wirelessly with the collector 116 to transmit information about measured consumption of electricity to the collector 116. Each of the electricity meters 114 may have a wireless registered communication relationship 506 path to the collector 116 that is either a direct communication relationship 506 path to the collector 116 or an indirect communication relationship 506 path through one or more other electricity meters 114 that serve as repeaters. The wireless network 112 may include one or more remotely located displays 450 that are in associated communication relationships 508 with a respective number of electricity meters 114. As discussed above, the battery-powered meters 400 may measure consumption of a commodity other than electricity.

The network 112 may include an associated communication relationship 504 between one electricity meter 114 and one or more battery-powered meters 400 via the respective modules 402. The electricity meter 114 (or 114r/s or 114s) may receive information about measured consumption of the other commodity 410 from the associated battery-powered meter 400 via the module 402 and store the received information in a slot in table 416. As discussed above, the electricity meter 114r/s or 114s may also transmit both information about consumption of electricity measured by it and the information about consumption of the other commodity 410 received from the associated battery-powered meter 400 to the collector 116 via the wireless network 112. The electricity meter 114r/s or 114s may also transmit this same information to an associated remotely located display 450.

Accordingly, in an embodiment of the wireless network 112, the associated battery-powered meter 400 via module 402 may communicate information about consumption of the other commodity 410 measured by it to the associated electricity meter 114 (or 114r/s or 114s). The meter 400 via module 402 may also, upon determining that a quality of the communication 520 with the associated electricity meter 114r/s or 114s has fallen below a predetermined threshold 530 (530a, 530b, 530c, or 530d), establish a registered communication relationship 502 with another electricity meter 114 and communicate its measured commodity consumption information 410 to that other electricity meter 114. The quality of communication 520 may be a read success average (or rate) 522 or an RSSI 524. Stated somewhat differently, if communication with the associated electricity meter 114r/s or 114s is insufficient (as indicated by the quality of communication falling below the predetermined threshold) then the meter 400 will seek to communicate with at least a second electricity meter 114.

While systems and methods have been described and illustrated with reference to specific embodiments, those skilled in the art will recognize that modification and variations may be made without departing from the principles described above and set forth in the following claims. For example, although in the embodiments described above, the systems and methods of the embodiments are described in the context of a network of metering devices, such as electricity, gas, or water meters, it is understood that the embodiments can be implemented in any kind of network in which it is necessary to obtain information from or to provide information to end devices in the system, including without limitation, networks comprising meters, in-home displays, in-home thermostats, load control devices, or any combination of such devices. Accordingly, reference should be made to the following claims as describing the scope of the embodiments.

What is claimed is:

1. In a wireless network comprising a collector and a plurality of electricity meters that measure consumption of electricity and that bi-directionally communicate wirelessly with the collector to transmit information about measured consumption of electricity to the collector, each of the electricity meters having a wireless communication path to the collector that is either a direct communication path to the collector or an indirect communication path through one or more other electricity meters that serve as repeaters, a method performed by a select one of the electricity meters, comprising:

receiving a message, from a battery-powered meter that measures consumption of a commodity other than electricity, which designates the select one of the electricity meters as an associated meter, such that an association is established with the battery-powered meter that measures consumption of a commodity other than electricity;

in response to establishing the association, receiving information about measured consumption of the other commodity from the associated battery-powered meter and storing the received information; and transmitting both information about consumption of electricity measured by the select one electricity meter and the information about consumption of the other commodity received from the associated battery-powered meter to the collector via the wireless network.

2. The method recited in claim 1, wherein the associated battery-powered meter also transmits its information about measured consumption of the other commodity to the collector via at least one other electricity meter that is also one of the limited number of the plurality of electricity meters with which the battery-powered meter can associate, and wherein the method performed by the select one electricity meter further comprises:
upon a failure by the select one electricity meter to receive information about measured consumption of the other commodity from the associated battery-powered meter within a predetermined amount of time, receiving information about consumption of the other commodity measured by the associated battery-powered meter from a different source in the wireless network.

3. The method recited in claim 2, wherein the different source is the collector of the wireless network.

4. The method recited in claim 2, wherein the different source is the at least one other electricity meter to which the associated battery-powered meter also transmits its measured consumption information.

5. The method recited in claim 1, wherein the association between the select one electricity meter and the at least one battery-powered meter is determined by information provided to the select one electricity meter from the collector, the information identifying the battery-powered meter as a meter with which the select one electricity meter is to associate.

6. The method recited in claim 1, wherein the remotely located display is a battery-powered device.

7. The method recited in claim 1, wherein the remotely located display is a constantly-powered device.

8. In a wireless network comprising a collector and a plurality of electricity meters that measure consumption of electricity and that bi-directionally communicate wirelessly with the collector to transmit information about measured consumption of electricity to the collector, each of the electricity meters having a wireless communication path to the collector that is either a direct communication path to the collector or an indirect communication path through one or more other electricity meters that serve as repeaters, a method performed by a battery-powered meter that measures consumption of a commodity other than electricity, comprising:
transmitting a message to a select one electricity meter of the plurality of electricity meters, the message comprising an associated meter field containing a destination address of the electricity meter such that the battery-powered meter is identified as a meter with which the electricity meter is to associate;
establishing an association with the select one electricity meter that is one of a limited number of the plurality of electricity meters with which the select one battery-powered meter can associate; and
upon determining that a quality of the communication with the associated select one electricity meter has fallen below a first predetermined threshold, establishing communication with at least one other electricity meter and communicating its measured commodity consumption information to that other electricity meter and the select one electricity meter.

9. The method recited in claim 8, wherein the quality of communication is a rate of successfully received messages from the associated select one electricity meter.

10. The method recited in claim 8, wherein the battery-powered meter establishes communications with the at least one other electricity meter by:
receiving a communication from the at least one other electricity meter;
determining a quality of communication with the at least one other electricity meter; and
establishing communications with the at least one other electricity meter upon determining that the quality of communication with the at least one other electricity meter meets or exceeds a quality of communication with any other electricity meters from which the battery-powered meter has received communication.

11. The method recited in claim 10, wherein the quality of communication is a received signal strength indication.

12. A wireless network comprising:
a collector;
a plurality of electricity meters that measure consumption of electricity and that bi-directionally communicate wirelessly with the collector to transmit information about measured consumption of electricity to the collector, each of the electricity meters having a wireless communication path to the collector that is either a direct communication path to the collector or an indirect communication path through one or more other electricity meters that serve as repeaters;
at least one remotely located display associated with one of the electricity meters; and
a battery-powered meter that measures consumption of a commodity other than electricity,
wherein a select one of the plurality of electricity meters:
receives a message, from a battery-powered meter that measures consumption of a commodity other than electricity, which designates the select one of the electricity meters as an associated meter, such that an association is established with the battery-powered meter that measures consumption of a commodity other than electricity;
receives information about measured consumption of the other commodity from the associated battery-powered meter and stores the received information; and
transmits both information about consumption of electricity measured by it and the information about consumption of the other commodity received from the associated battery-powered meter to the collector via the wireless network.

13. The system recited in claim 12, wherein the associated battery-powered meter:
communicates information about consumption of the other commodity measured by it to the associated select one electricity meter; and
upon determining that a quality of the communication with the associated select one electricity meter has fallen below a predetermined threshold, establishes communication with at least one other electricity meter that is also one of the limited number of the plurality of electricity meters with which the battery-powered meter can associate, and communicates its measured commodity consumption information to that at least one other electricity meter.

14. The system recited in claim 12, wherein the association between the select one electricity meter and the battery-powered meter is determined by information provided to the select one electricity meter from the collector, the information identifying the battery-powered meter as a meter with which the select one electricity meter is to associate.

15. The system recited in claim 12, wherein the at least one remote display is a battery-powered device.

16. The system recited in claim 12, wherein the at least one remote display is a constantly-powered device.

\* \* \* \* \*